(12) United States Patent
Zappacosta et al.

(10) Patent No.: US 11,575,623 B2
(45) Date of Patent: **\*Feb. 7, 2023**

(54) AUTOMATICALLY GENERATING A RESPONSE ON BEHALF OF A FIRST USER TO A REQUEST RECEIVED FROM A SECOND USER

(71) Applicant: THUMBTACK, INC., San Francisco, CA (US)

(72) Inventors: Marco Zappacosta, San Francisco, CA (US); Yue Zhao, Orinda, CA (US); Weikang Wan, Foster City, CA (US); Togan Adrien Olczak, San Francisco, CA (US); Marcus Bertilson, San Francisco, CA (US); Benjamin Robert Anderson, San Francisco, CA (US)

(73) Assignee: THUMBTACK, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,629

(22) Filed: Aug. 17, 2020

(65) Prior Publication Data

US 2020/0382452 A1 Dec. 3, 2020

Related U.S. Application Data

(63) Continuation of application No. 15/890,287, filed on Feb. 6, 2018, now Pat. No. 10,749,819.
(Continued)

(51) Int. Cl.
*G06Q 10/06* (2012.01)
*H04L 67/02* (2022.01)
(Continued)

(52) U.S. Cl.
CPC ............ *H04L 51/02* (2013.01); *G06F 40/186* (2020.01); *G06Q 10/063112* (2013.01);
(Continued)

(58) Field of Classification Search
CPC .. G06Q 10/063112; H04L 67/02; H04L 51/02
See application file for complete search history.

(56) References Cited

U.S. PATENT DOCUMENTS 8,160,929 B1    4/2012  Park et al.
9,177,056 B2   11/2015  Zappacosta et al.
(Continued)

OTHER PUBLICATIONS

Final Office Action, U.S. Appl. No. 15/890,287, dated Nov. 5, 2018, 18 pages.
(Continued)

*Primary Examiner* — Shirley X Zhang
(74) *Attorney, Agent, or Firm* — Thompson Hine LLP

(57) ABSTRACT

A server automatically generates a response on behalf of a first user to a request received from a second user. The server receives configuration information for configuring automatic response generation for the first user, including information identifying the first user, information specifying a type of service provided by the first user including a plurality of parameters that define details for the service, and information providing an availability of the first user to provide the specified type of service. A request is received from the second user. The first user is selected from multiple users to respond to the request. A response is automatically generated using at least some of the received configuration information. The response is automatically transmitted to the second user on behalf of the first user.

18 Claims, 26 Drawing Sheets

Related U.S. Application Data

(60) Provisional application No. 62/456,094, filed on Feb. 7, 2017.

(51) Int. Cl.

| | | |
|---|---|---|
| *H04L 51/02* | (2022.01) | |
| *H04L 67/306* | (2022.01) | |
| *H04L 67/00* | (2022.01) | |
| *G06F 40/186* | (2020.01) | |
| *G06Q 30/02* | (2012.01) | |
| *H04L 67/51* | (2022.01) | |

(52) U.S. Cl.
CPC ............. *G06Q 30/02* (2013.01); *H04L 67/02* (2013.01); *H04L 67/306* (2013.01); *H04L 67/34* (2013.01); *H04L 67/51* (2022.05)

(56) References Cited

U.S. PATENT DOCUMENTS

| | | | |
|---|---|---|---|
| 10,019,743 | B1 | 7/2018 | Finch et al. |
| 10,552,773 | B1 | 2/2020 | Shah et al. |
| 2001/0032165 | A1 | 10/2001 | Friend et al. |
| 2004/0230676 | A1* | 11/2004 | Spivack .................. G06F 16/80 707/E17.122 |
| 2004/0254821 | A1 | 12/2004 | Glaser |
| 2005/0010484 | A1 | 1/2005 | Bohannon et al. |
| 2009/0112652 | A1 | 4/2009 | Kelsey et al. |
| 2009/0287596 | A1 | 11/2009 | Torrenegra |
| 2011/0131595 | A1 | 6/2011 | Xue et al. |
| 2011/0137730 | A1 | 6/2011 | McCarney et al. |
| 2013/0138475 | A1 | 5/2013 | Allison et al. |
| 2014/0136443 | A1 | 5/2014 | Kinsey et al. |
| 2015/0317582 | A1 | 11/2015 | Nath et al. |
| 2016/0034995 | A1* | 2/2016 | Williams ........... G06Q 30/0631 705/26.43 |
| 2016/0335603 | A1 | 11/2016 | Davar et al. |
| 2017/0024657 | A1 | 1/2017 | Sahu et al. |
| 2017/0039890 | A1 | 2/2017 | Truong et al. |
| 2017/0220966 | A1 | 8/2017 | Wang |
| 2018/0091604 | A1 | 3/2018 | Yamashita et al. |
| 2018/0260787 | A1 | 9/2018 | Xi |
| 2018/0365597 | A1 | 12/2018 | Farrell et al. |

OTHER PUBLICATIONS

Final Office Action, U.S. Appl. No. 15/890,287, dated Sep. 3, 2019, 15 pages.
Final Office Action, U.S. Appl. No. 15/921,543, dated Jan. 24, 2019, 24 pages.
Final Office Action, U.S. Appl. No. 15/921,554, dated Nov. 2, 2018, 15 pages.
Final Office Action, U.S. Appl. No. 15/921,543, dated Mar. 10, 2020, 24 pages.
International Preliminary Report on Patentability, PCT App. No. PCT/US2018/017290, dated Aug. 22, 2019, 8 pages.
International Search Report and Written Opinion, PCT App. No. PCT/US2018/017290, dated Aug. 6, 2018, 10 pages.
Non-Final Office Action, U.S. Appl. No. 15/890,287, dated Apr. 1, 2019, 13 pages.
Non-Final Office Action, U.S. Appl. No. 15/890,287, dated Jan. 17, 2020, 17 pages.
Non-Final Office Action, U.S. Appl. No. 15/890,287, dated May 23, 2018, 12 pages.
Non-Final Office Action, U.S. Appl. No. 15/921,543, dated Aug. 26, 2019, 28 pages.
Non-Final Office Action, U.S. Appl. No. 15/921,543, dated Jul. 11, 2018, 21 pages.
Non-Final Office Action, U.S. Appl. No. 15/921,554, dated Apr. 12, 2019, 11 pages.
Non-Final Office Action, U.S. Appl. No. 15/921,554, dated Jul. 5, 2018, 13 pages.
Non-Final Office Action, U.S. Appl. No. 15/921,554, dated Sep. 13, 2019, 12 pages.
Notice of Allowance, U.S. Appl. No. 15/890,287, dated Apr. 27, 2020, 6 pages.
Notice of Allowance, U.S. Appl. No. 15/921,554, dated Feb. 21, 2020, 9 pages.
Final Office Action, U.S. Appl. No. 15/929,223, dated Feb. 9, 2021, 35 pages.
Non-Final Office Action, U.S. Appl. No. 15/929,223, dated Oct. 9, 2020, 24 pages.

\* cited by examiner

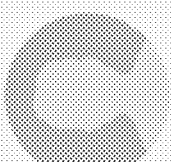

FIG. 12C

| | EQUIPMENT / SERVICES NEEDED |
|---|---|
| 1231 | MC |
| 1232 | Microphones |
| 1233 | Lighting |
| 1234 | Fog machine |
| | DOES VENUE PROVIDE SOUND EQUIPMENT |
| 1236 | Yes |
| 1237 | No, DJ must provide sound equipment |

| | EVENT TYPE |
|---|---|
| 1221 | Birthday party |
| 1222 | Wedding |
| 1223 | Corporate event |
| 1224 | Prom / school dance |
| 1225 | Graduation party |
| 1226 | Summer party |
| 1227 | Family reunion |
| 1228 | Anniversary party |
| 1229 | Engagement party |

1205, 1220

| | 1205 |
|---|---|
| PROJECT DURATION | |
| 1 hour | ☐ — 1241 |
| 2 hours | ☐ — 1242 |
| 3 hours | ☐ — 1243 |
| 4 hours | ☐ — 1244 |
| 5 hours | ☐ — 1245 |
| 6 hours | ☐ — 1246 |
| 7 hours | ☐ — 1247 |
| 8 hours | ☐ — 1248 |
| 8+ hours | ☐ — 1249 |

FIG. 12D

| | 1205 |
|---|---|
| INDOORS OR OUTDOORS | |
| Indoors | ☐ — 1251 |
| Outdoors | ☐ — 1252 |
| I'm not sure yet | ☐ — 1253 |
| Number of guests | |
| 25 guests or fewer | ☐ — 1254 |
| 26 - 50 guests | ☐ — 1255 |
| 51 - 100 guests | ☐ — 1256 |
| 100 - 150 guests | ☐ — 1257 |
| 150 - 200 guests | ☐ — 1258 |
| More than 200 guests | ☐ — 1259 |

FIG. 12E

MUSIC PREFERENCES
- Pop — 1271
- Rock — 1272
- R&B / Soul — 1273
- Hip-hop / Rap — 1274
- EDM (electronic dance music) / House /... — 1275
- Top 40 — 1276
- Latin — 1277
- Country — 1278

AGE OF GUESTS
- 12 years old or younger — 1261
- 13 - 17 years old — 1262
- 18 - 30 years old — 1263
- 31 - 50 years old — 1264
- 51 or older — 1265

| 2310 | When do you want to use this template? |
|---|---|
| 2312 | ○ Never for Event DJ requests |
| 2314 | ○ For Event DJ requests that don't match a specific template |
| 2316 | ✓ For specific Event DJ requests only |
| 2318 | Which criteria should this template match? |
| 2320 | Event Type |
| 2322 | ☐ Birthday Party |
| 2324 | ☑ Wedding |
| 2326 | ☑ Corporate Event |
| 2328 | ☐ Prom/School dance |
| 2330 | Music Preferences |
| 2332 | ☑ Pop |
| 2334 | ☑ Rock |
| 2336 | ☑ Hip-hop |
| 2340 | Number of Guests |
| 2342 | ☑ 25 or fewer |
| 2344 | ☑ 26-50 |
| 2346 | ☐ Over 50 |
| 2350 | Extra Services |
| 2352 | ☑ MC services |
| 2354 | ☐ Fog machine |
| 2356 | ☐ Microphones |

FIG. 23

Total Price ⌐— 2415    2410
[PRICE]

Hi <REQUESTER NAME>,
— 2420                                              ⌐— 2425
My name is Joe Smith. I'd be delighted to DJ at your <SERVICE DESCRIPTION> on <SERV_DATE>. I have been in business since 2007 and have worked with many different customers.
— 2430                                              ⌐— 2435
I see that you are mainly looking for <SERVICE DESCRIPTION DETAIL>.
                                                    ⌐— 2435
I fit well within your budget. A rough estimate for <SERVICE DESCRIPTION DETAIL> is <PRICE>.
— 2415
You can call me at 555-123-4567 or reply to this message. I look forward to hearing from you!

Joe Smith

⌐— 2450
| UPLOAD ATTACHMENT |

| 2510 | What kind of event are you hosting? |
|---|---|
| 2512 | ☐ Birthday Party |
| 2514 | ☑ Wedding |
| 2516 | ☐ Corporate Event |
| 2518 | ☐ Prom/School dance |
| 2520 | How many guests do you expect |
| 2522 | ☐ 25 or fewer |
| 2524 | ☑ 26-50 |
| 2526 | ☐ Over 50 |
| 2530 | What kind of music would you like? |
| 2532 | ☑ Pop |
| 2534 | ☐ Rock |
| 2536 | ☐ Hip-hop |
| 2540 | What additional equipment or services would you like? |
| 2542 | ☑ MC services |
| 2544 | ☐ Fog machine |
| 2546 | ☑ Microphones |
| 2550 | Where do you need the DJ? |
| 2552 | 94301 |

FIG. 25

AUTOMATICALLY GENERATING A RESPONSE ON BEHALF OF A FIRST USER TO A REQUEST RECEIVED FROM A SECOND USER

CROSS-REFERENCE TO RELATED APPLICATIONS

This application is a continuation of U.S. application Ser. No. 15/890,287, filed Feb. 6, 2018, which claims the benefit of U.S. Provisional Application No. 62/456,094, filed Feb. 7, 2017, which is hereby incorporated by reference.

FIELD

Embodiments of the invention relate to the field of data processing; and more specifically, to an improved system for automatically generating a response on behalf of a first user to a request received from a second user.

BACKGROUND

Responses are commonly generated for responding to requests in data processing. Some responses are fully automatic and apply to all requests. For example, in the context of web servers, a request for a web page is typically responded with a response that contains the requested web page (if such a web page exists). This response is typically not customized to the individual requester.

Other types of responses are manually generated by the responder. For example, websites exist that allow potential service buyers to submit a request for a service that includes certain details of the request such as a category and a location, and the online marketplace may transmit the request to one or more service professionals that match the requested category and location, and the service professional may compose and generate a response. These responses are largely manual and can be time intensive.

Online marketplaces exist for transacting for services online. For instance, websites exist that serve as a repository for reviews of businesses and/or services. Potential service buyers may be presented with a directory of service professionals ranked by some measure of quality (e.g., user reviews), and asked to select from that list. These directories do not make any effort to help service buyers find service professionals who have interest and/or intent to do their job, or services professionals who are a good fit for the specific job of the service buyer. Nor do they consider general supply/demand in the market as a whole. As a result, both service buyers and service professionals spend a lot of time and effort to find the best match between them in these kinds of marketplaces.

Websites exist that allow potential service buyers to search for a service professional and/or to be matched with a service professional. By way of example, the potential service buyer may post a request for a service that includes certain details of the request such as a category and a location, and the online marketplace may transmit the request to all of the service professionals that match the requested category and location. Zero or more of the service professionals may respond to the request by providing a quote for the service. However, transmitting the request to all of the service professionals (or many service professionals) does not scale with many requests and many service professionals using the online marketplace. For instance, a particular service professional may become inundated with requests, and/or many service professionals may respond to the potential buyer. Instead of transmitting the request to all of the service professionals that match the requested category and location, a simple limiting system may be used such that if the service professional did not use marketplace over a certain period of time, they would not be sent requests or would be sent a limited number of requests. However, this type of simple limiting system may have unintended consequences. For instance, if a service professional went on vacation, they may come back and find that the marketplace was not sending them requests. Also, in sending limited requests, service professionals may not be receiving the requests that they were interested in, which may cause them to stop using the online marketplace.

SUMMARY

One general aspect includes a method in a server for automatically generating a response on behalf of a first user to a request received from a second user, including: receiving configuration information for configuring automatic response generation for the first user, where the received configuration information for configuring automatic response generation includes: information identifying the first user, information specifying a type of service provided by the first user including a first plurality of parameters that define details for the service, and information providing an availability of the first user to provide the specified type of service. The method also includes receiving the request from the second user. The method also includes selecting the first user from a plurality of users to respond to the request received from the second user. The method also includes automatically generating the response using at least some of the received configuration information. The method also includes automatically transmitting the response to the second user. Other embodiments of this aspect include corresponding computer systems, apparatus, and computer programs recorded on one or more computer storage devices (such as non-transitory machine-readable storage medium), each configured to perform the operations of the methods.

Implementations may include one or more of the following features. The method where the request specifies that the response be automatically generated as opposed to being manually generated. The method where selecting the first user from the plurality of users includes receiving a selection indication from the second user of the first user. The method where the received configuration information further includes information indicating a number of responses can be generated on behalf of the first user in a given period of time; and where selecting the first user from the plurality of users includes determining that the first user is within the number of responses over the given period of time. The method where the received configuration information further includes information indicating pricing for the type of service including the plurality of parameters, and where automatically generating the response includes calculating a total price to fulfill the request and including the total price in the response. The method where the request specifies a second plurality of parameters, and where selecting the first user to respond to the request received from the second user includes determining that the first user meets the second plurality of parameters specified in the request. The method where automatically generating the response includes including information in the response from the received configuration information that matches the second plurality of parameters specified in the request.

BRIEF DESCRIPTION OF THE DRAWINGS

The invention may best be understood by referring to the following description and accompanying drawings that are used to illustrate embodiments of the invention. In the drawings:

FIG. 3 illustrates an exemplary interface that is configured to receive input from a professional regarding the category of service that they provide, according to an embodiment;

FIG. 4 illustrates an exemplary interface that is configured to receive input from a professional regarding the subcategory of service that they provide, according to an embodiment;

FIG. 7 illustrates an exemplary interface that is configured to receive input from the professional to specify contact information of the professional, according to an embodiment;

FIG. 8 illustrates an exemplary interface that is configured to receive input from the professional to specify profile information of the professional, according to an embodiment;

FIG. 12B illustrates a portion of the interface of FIG. 12A that is configured to receive input from the professional defining the types of events that the professional is interested in responding to requests, according to an embodiment;

FIG. 12C illustrates a portion of the interface of FIG. 12A that is configured to receive input from the professional defining whether the professional is interested in responding to requests where certain additional equipment or services have been indicated as needed, according to an embodiment;

FIG. 12D illustrates a portion of the interface of FIG. 12A that is configured to receive input from the professional defining the duration of the event in which the professional is interested in responding, according to an embodiment;

FIG. 12E illustrates a portion of the interface of FIG. 12A that is configured to receive input from the professional defining the professional's interest in responding to requests that specify an indoor or outdoors preference, and the number of guests, according to an embodiment;

FIG. 12F illustrates a portion of the interface of FIG. 12A that is configured to receive input from the professional defining the professional's interest in responding to requests with different age of guest ranges, according to an embodiment;

FIG. 12G illustrates a portion of the interface of FIG. 12A that is configured to receive input from the professional defining the professional's interest in responding to requests with different music preferences, according to an embodiment;

FIG. 15 illustrates an exemplary interface that is configured to receive input from the professional to define the base price for a service, according to an embodiment;

FIG. 16 illustrates an exemplary interface that is configured to receive input from the professional to define whether the price of the service is different on the weekends, according to an embodiment;

FIG. 17 illustrates an exemplary interface that is configured to receive input from the professional to define the base price for a service on the weekends, according to an embodiment;

FIG. 18 illustrates an exemplary interface that is configured to receive input from the professional to define whether any add-ons to the service are offered and how much they cost, according to an embodiment;

FIG. 23 illustrates an exemplary interface that is configured to receive input from the professional to configure a set of one or more matching preferences for a template, according to an embodiment;

FIG. 24 illustrates an exemplary interface that is configured to receive input from the professional to specify or edit a number of placeholder values in a template, according to an embodiment;

FIG. 25 illustrates an exemplary interface that is configured to receive input from a customer to submit a request for a DJ event service, according to an embodiment;

DESCRIPTION OF EMBODIMENTS

Figure 1:
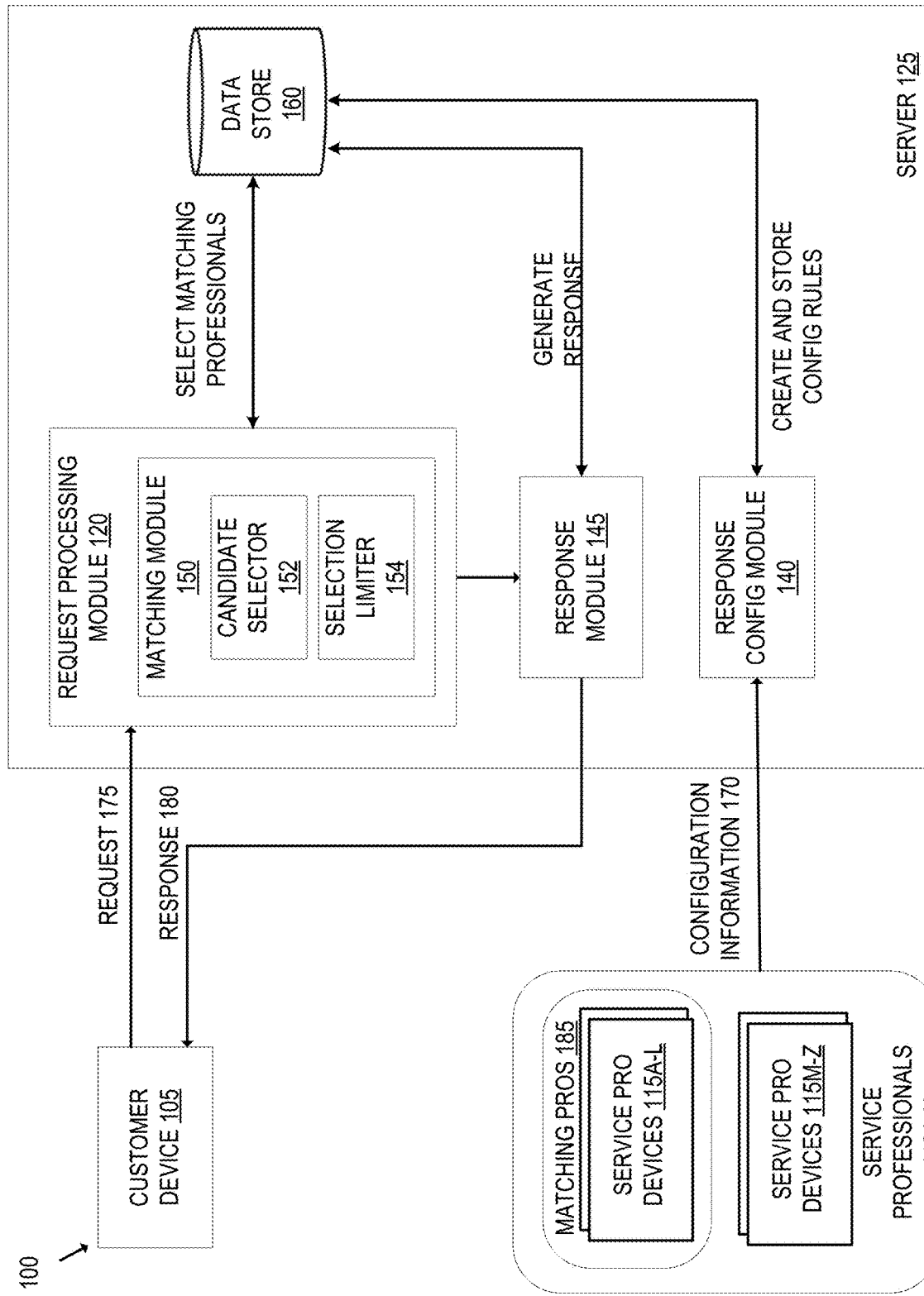
FIG. 1 is a block diagram that illustrates an exemplary architecture for an improved system for automatically generating a response on behalf of a first user to a request received from a second user, according to an embodiment.

In the following description, numerous specific details such as types and interrelationships of system components, interfaces, are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A method and apparatus for an improved system for automatically generating a response on behalf of a first user to a request received from a second user is described. Given a request from a first user (sometimes referred herein as a "requester" or a "customer"), that request is matched with a set of one or more different users (sometimes referred herein as "responders" or "professionals"). In a specific example, the request is for a service and data from the request is used to match the request to identified responders that may be suitable for fulfilling the service request. The data in the request includes data that is structured, and may be received by the system through input of a form submitted by the requester. The submission of the request form provides a relatively large set of structured data that is used when matching with responders. Instead of sending the request from a requester to a matching responder, a response is automatically generated by the system on behalf of the responder and sent to the requester. The response may be referred herein as a quote, and may be used by the customer to determine whether to hire the professional.

Prior to automatically generating the response, the responder provides configuration information such as what requesters they are willing to respond to and the types of jobs that they are willing to accept. The responder may also provide information for automatic generation of the response including their name, type of service they provide, location, travel preferences, profile photo, service description, and other basic information about their business. The responder may provide information about the price they will charge for the service. The responder may provide information regarding the number of jobs they can perform in a given period of time.

The responder(s) that are selected for automatic generation of responses are selected from many more professionals. In an embodiment, the selected responder(s) are selected based on multiple level matching where the first level of matching may be performed based on a set of course features including one or more of category, location, and progress points (measure of profile completeness), and the responder(s) that match these features are referred to as candidate responders. A second level of matching may include computing a score for each candidate responder based on a scoring function and feature data, to determine which responder(s) to select. The selection may be based on machine learning models with heuristics. For instance, in an embodiment, the decision of selecting responder(s) may be based on one or more of the following: a relevance of the responder's response to the requester, maximizing fulfillment of requests, and maximizing an overall aggregate measure of relevance across a plurality of requests.

FIG. 1 is a block diagram that illustrates an exemplary architecture for an improved system for automatically generating a response on behalf of a first user to a request from a second user, according to an embodiment. The system 100 illustrated in FIG. 1 includes a customer device 105 that is operated by a customer, service professional devices 115A-N that are each operated by a different service professional of the service professionals 112A-N, and a server 125. The customer device 105 and the service professional devices 115A-Z each are types of computing devices that interact with the server 125 and may be a desktop, laptop, smartphone, tablet, wearable device, etc., that executes a client network application. The client network application may be a web browser (e.g., a desktop browser, a mobile optimized browser), a native application, or other application that can access network resources such as web pages, images, videos, or other computer files. The customer device 105 and the service professional devices 115A-Z interact with the server 125 over a network, such as the Internet. The server professional devices 115A-Z are configured to provide response configuration information to the server 125, which the server 125 uses when automatically generating response(s) on behalf of the service professionals 112A-N.

The server 125 is a computing device that provides functionality for the improved system for generating a response to a request. In the embodiment illustrated in FIG. 1, the server 125 includes the request processing module 120, the response configuration module 140, the response module 145, and the data store 160. The data store 160 stores data related to the service professionals and the customers. The data store 160 is used by the server 125 (e.g., the request processing module 120, the response configuration module 140, and/or the response module 145) when automatically generating the responses. For each service professional, the data store 160 may store service professional profile information of the service professional (typically provided by the service professional), and statistical information of the service professional (typically derived or calculated by the server 125). The service professional profile information may include, for each service professional, one or more of the following: the service professional's name, the category (or categories) offered by that service professional, the location where the service is offered, whether the service professional travels to provide the service, contact information of the service professional (e.g., email address, phone number, street address) pictures of the service professional and/or service, videos of the service professional and/or service, service description, whether the professional has passed a background check, and whether the professional has shown proof of being licensed, etc. The statistical information of the service professional may include one or more of the following: the number of times the professional has been hired, the number of quotes sent by, or on behalf, of that professional, the number of requests sent to that professional, the hire rate of the professional (the number of hires over the number of quotes), the number of services performed by the professional in all categories, the rate at which the professional responds to a request or message from a customer, review(s) of the service professional (typically provided by past customers), and a rating of the service professional based on the review(s). For each customer, the data store 160 may store profile information of the customer (typically provided by the customer) and/or statistical information of the customer (typically derived or calculated by the server 125). The customer profile information may include, for each customer, one or more of the following: the name of the customer, the location of the customer, and contact information of the customer (e.g., email address, phone number, street address). The statistical information of each customer may include one or more of the following: hire rate of the customer in the requested category (hires over requests), hire rate of the customer in all categories (hires over requests), and the rate at which the customer responds to a service professional, review(s) of the customer (typically provided by past service professionals). Although illustrated in FIG. 1 as part of the server 125, the data store 160 may be located in a separate computing device than the server 125 and queried by the server 125.

The response configuration module 140 is adapted to be used by the professionals for configuring automatic generation of a response to a request. The response configuration module 140 may provide an interface (e.g., available as a website or part of a native application) that allows responders to configure and manage (e.g., create, view, edit, delete, modify) rules for the automatic generation of responses to requests. As will be described in greater detail later herein, the response configuration module 140 is configured to allow a professional to provide profile information including one or more of the service professional's name, the type of service provided, the travel preferences of the professional (e.g., whether the professional travels to customers, whether customers travel to the professionals, how far the professional is willing to travel), profile photo, and a service description; job preferences (what types of jobs the professional wants); pricing information; availability information (e.g., when the professional is available for a job, when the professional is not available for a job); and a budget. The response configuration module 140 may be adapted to receive response template configuration information that allows a professional to create, view, edit, delete, and/or configure a response template.

The request processing module 120 is configured to receive and process requests from requesters. Each request defines the parameters of what is being requested. In a specific embodiment where the request is a request for service, the request defines the type of service requested, the location where the service is desired, a category of the desired service, and one or more request preferences. Typically, the location indicates where the customer is located and/or how far the customer is willing to travel to purchase services. The location may be entered as a city, a street within a city, a zip code, etc. The category of service indicates the type of service that is desired. There may be many different categories that can be selected and/or input by the customer. As an example, French Lessons may be a category. As another example, Interior Design may be a category. The request may also include information about the requested job, dependent upon the job category. This information is sometimes referred herein as request preferences. For instance, if the category is Interior Design, the request may specify what room(s) (e.g., kitchen, living room, bedroom, dining room, commercial or office space, etc.) are desired to be improved. As another example, if the category is French Lessons, the request may specify the age (or age range) of the person that wants to improve or learn French.

The request processing module 120 may select the responder(s) that are eligible for responding to the request. In an embodiment, the request processing module 140 selects, from multiple responders, a set of one or more responders 185 for responding to the request as a result of a matching process performed by the matching module 150. This matching may include selecting the set of responders that match at least the requested location and category, and may be based on data analysis that indicates one or more of the following: a determined interest level of the responder in the request; a relevance of the responder to the requester; relatively short term supply and demand in the marketplace for the requested job; and relatively long term supply and demand in the marketplace. In another embodiment, instead of matching the request with a set of responders(s), the request specifies the responder(s) for responding. For instance, the server 125 may be configured to allow the requester to view/browse a list of responder(s) (e.g., that match the requested location and category) and select the responder(s) directly. In this embodiment, the request processing module 140 selects the responder based on the identified responder in the request itself. In the example shown in FIG. 1, the professionals 185 that operate the service professional devices 115A-L have been determined to match the request.

The response module 145 is configured to automatically generate a response on behalf of a selected responder, based on the response configuration information received from the responders and the request. The response module 145 is also configured to communicate the generated response to the requesting device.

Figure 2:
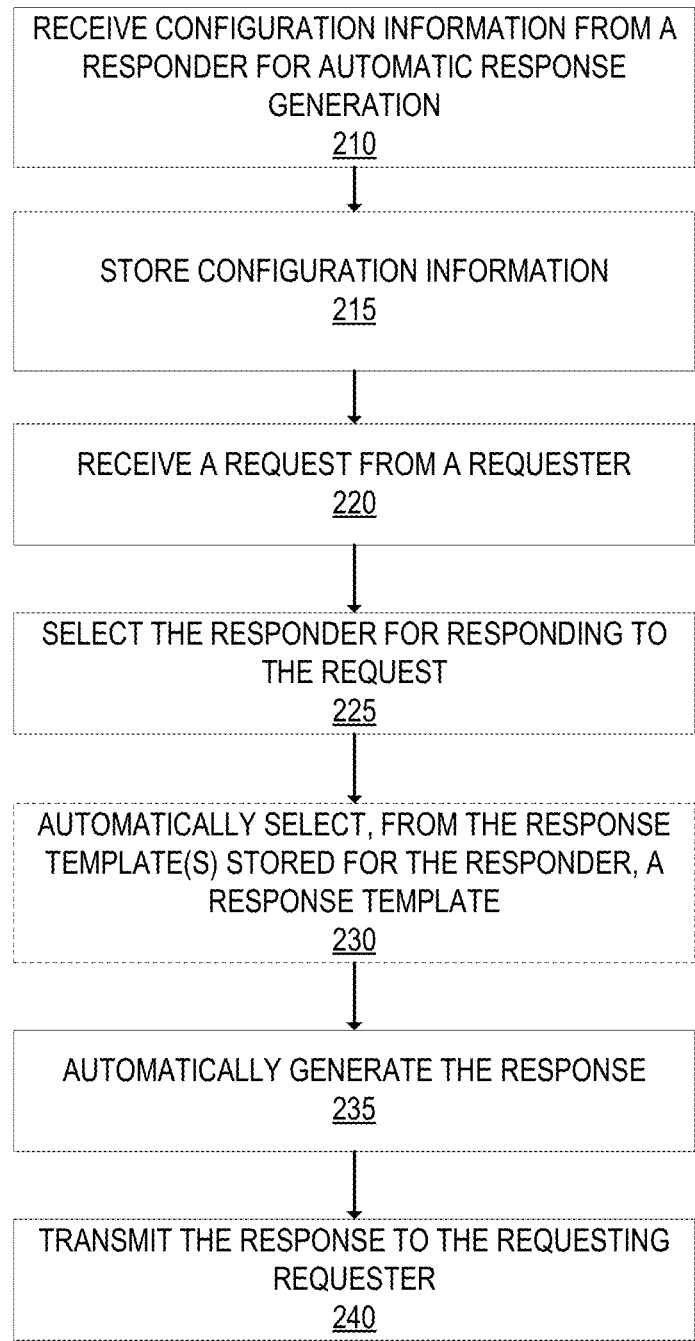
FIG. 2 is a flow diagram that illustrates exemplary operations for an improved system for automatically generating responses to requests, according to an embodiment.

FIG. 2 is a flow diagram that illustrates exemplary operations for an improved system for automatically generating responses to requests, according to an embodiment. The operations of FIG. 2 and the other flow diagrams will be described with respect to the exemplary embodiment of FIG. 1. However, it should be understood that the operations of FIG. 2 and the other flow diagrams can be performed by different embodiments than those discussed with FIG. 1, and the exemplary embodiment of FIG. 1 can perform different embodiments than those discussed with respect to FIG. 2 and the other flow diagrams.

At operation 210, the response configuration module 140 receives configuration information 170 for configuring automatic response generation on behalf of a responder. The received configuration information 170 is used by the response configuration module 140 to configure rules for generating responses on behalf of the responder. For instance, in an embodiment where the response is generated in reply to a request for service, the configuration information 170 may specify one or more of: profile information including one or more of the service professional's name, the type of service provided, the travel preferences of the professional (e.g., whether the professional travels to customers, whether customers travel to the professionals, how far the professional is willing to travel), profile photo, and a service description; job preferences (what types of jobs the professional wants); pricing information; availability information (e.g., when the professional is available for a job, when the professional is not available for a job); and a budget.

FIGS. 3-22 illustrate an exemplary interface of the response configuration module 140 for a service professional to provide input for configuring automatic response generation, according to an embodiment. The interfaces shown in FIGS. 3-22 are from a standalone application (also referred to as an "app") running on a mobile device of a service professional. However, it should be understood that similar interfaces can be used to receive the information such as through a web page that is displayed on a desktop or mobile device.

Figures 3, 4:
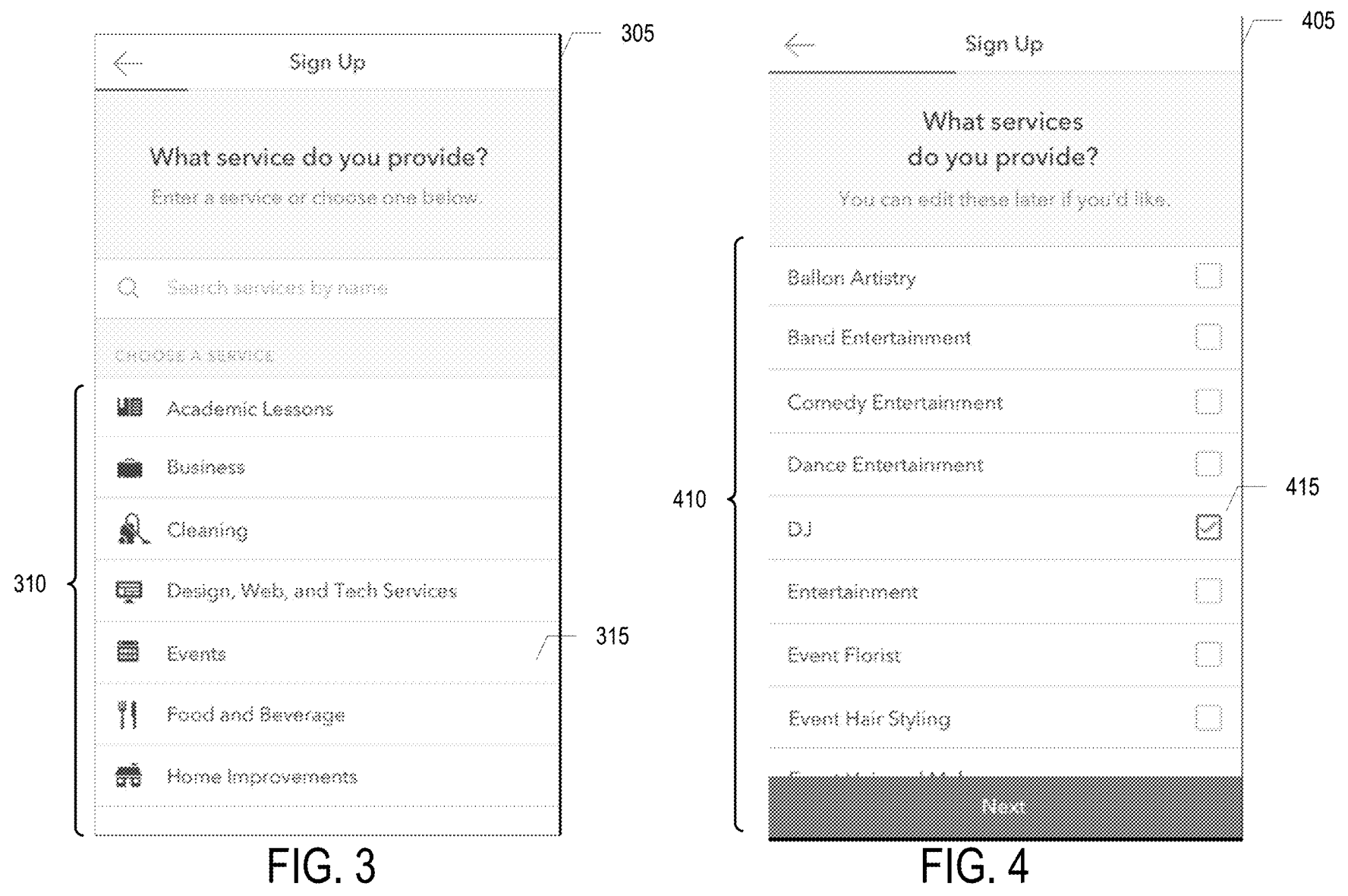
Figure 5:
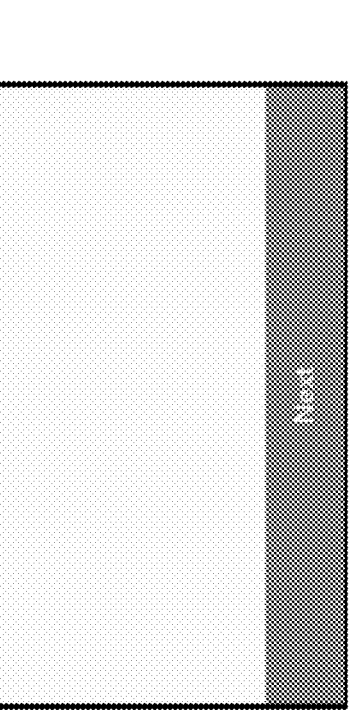
FIG. 5 illustrates an exemplary interface that is configured to receive input from a professional to specify if a related service is provided, according to an embodiment.

FIG. 3 shows an interface 305 that is configured to receive input from a professional regarding the category of service that they provide, either searching or selecting from a list of predefined service categories 310. In the example shown in FIG. 3, the predefined service categories 310 includes academic lessons, business, cleaning, design, web, and tech services, events, food and beverage, and home improvements. It should be understood that these categories are exemplary and more, less, or different categories may be displayed to the professional. In the example shown in the Figures, the professional is a DJ which falls under the event service category. Thus, if the professional selects the events category 315, the interface 405 is shown, which is configured to receive input from the professional that specifies the type of service provided by the professional. The list of services 410 are subcategories of the events categories for different kinds of event services. The subcategories depend on the parent category. As illustrated in FIG. 4, the subcategories include balloon artistry, band entertainment, comedy entertainment, dance entertainment, DJ, entertainment, event florist, and event hair styling. It should be understood that these subcategories are exemplary and more, less, or different subcategories may be displayed to the professional. Since in this example the professional provides DJ services, the element 415 representing a DJ is selected. Some services may have related services. FIG. 5 illustrates an interface 505 that is configured to receive input from the professional to specify if a related service is provided. In the example of FIG. 5, the related services for a DJ professional include audio recording and MC/hosting service, and the professional has selected element 515 representing that they provide audio recording service.

Figure 6:
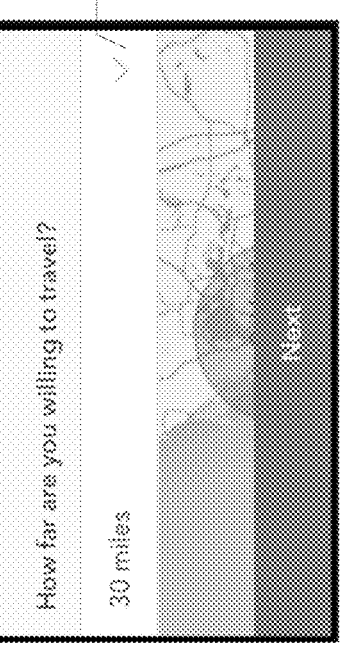
FIG. 6 illustrates an exemplary interface that is configured to receive input from the professional to specify the location of the professional and travel preferences of the professional, according to an embodiment.

FIG. 6 illustrates an interface 605 that is configured to receive input from the professional to specify the location of the professional and travel preferences of the professional. For instance, the interface 605 includes an element 615 indicating that the professional travels to the customer, an element 620 indicating that customers travel to the professional, an element 625 indicating that the service is performed remotely (e.g., phone or internet), an element 630 indicating a zip code of the professional, and an element 635 indicating how far the professional is willing to travel for providing the service. As illustrated in FIG. 6, the professional has selected elements 615 and 620 indicating that the professional both travels to customers and customers travel to the professional, provided a zip code in the element 630, and provided that they are willing to travel 30 miles for providing the service in element 635.

Figures 9, 10:
FIG. 9 illustrates an exemplary interface that is configured to receive input from the professional to describe the service they provide, according to an embodiment.
FIG. 10 illustrates an exemplary interface that is configured to receive input from the professional to specify other information, according to an embodiment.

FIG. 7 illustrates an interface 705 that is configured to receive input from the professional to specify contact information of the professional, such as their first name, last name, email address, and phone number. The interface 705 also allows the professional to enable or disable text messages through selection of the element 710. FIG. 8 illustrates an interface 805 that is configured to receive input from the professional to specify profile information of the professional including adding a profile photo through selection of element 810, describing their service through selection of element 815, entering information through selection of element 820, and asking for reviews through selection of element 825. Upon selecting the element 815, the interface 905 shown in FIG. 9 is shown, which allows the professional to describe their service. FIG. 10 shows an interface 1005 that is configured to receive input from the professional to specify other information including their name, address, and date of birth.

Figures 11, 12A:
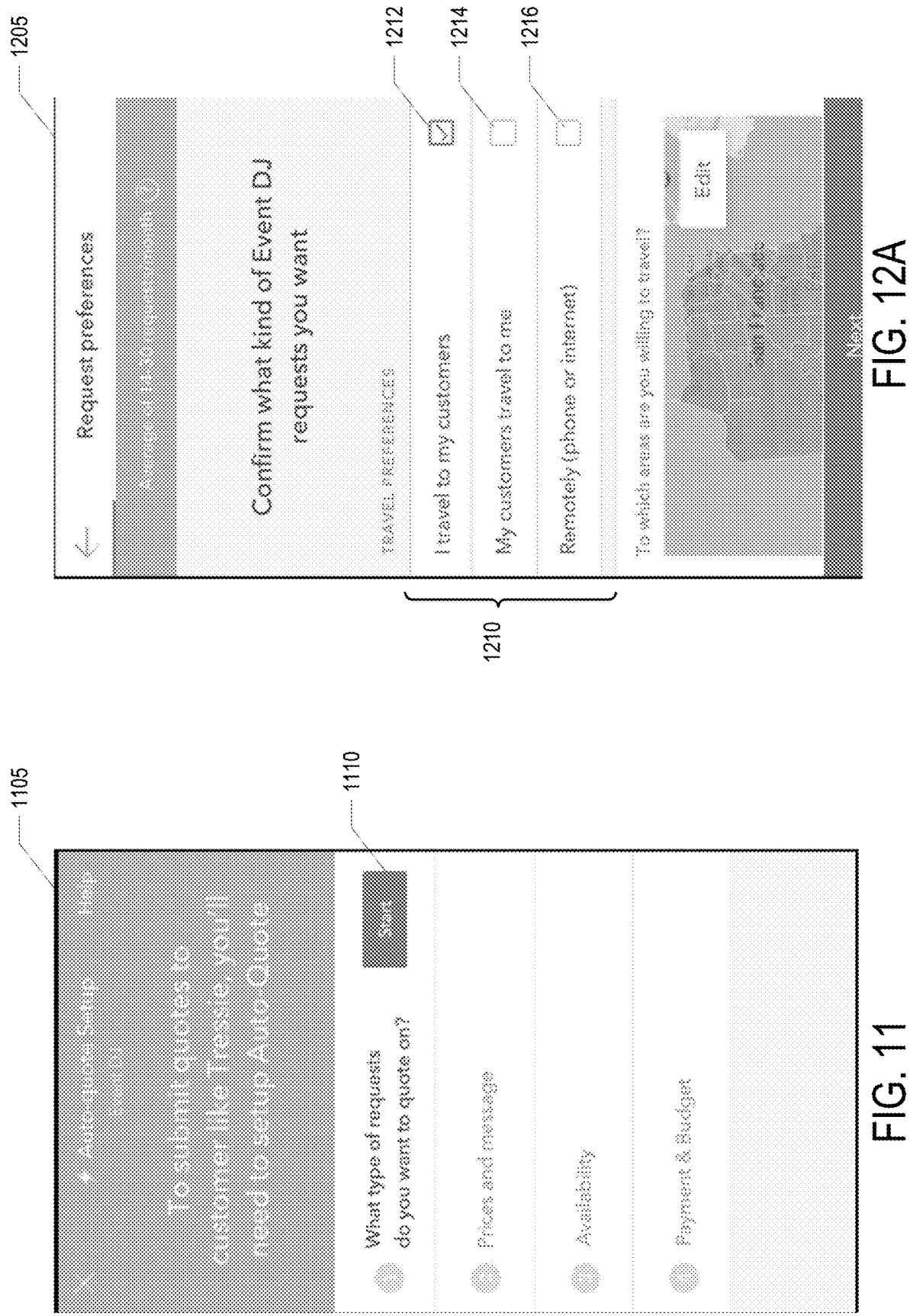
FIG. 11 illustrates an exemplary interface that begins a series of interfaces shown in FIGS. 12A-12G that are configured to receive input from the professional to setup automatic generation of quotes, according to an embodiment.
FIG. 12A illustrates an exemplary interface that is configured to receive input from the professional for providing travel preferences, according to an embodiment.

FIG. 11 illustrates an interface 1105 that begins a series of interfaces shown in FIGS. 12A-12G that are configured to receive input from the professional to configure automatic generation of quotes, according to an embodiment. In the example shown in FIGS. 11-12G, an automatic generation of quotes for a professional providing event DJ services is shown. Of course it should be understood that different interfaces with different elements can be used for different types of services. In an embodiment, the interface 1105 is provided to the professional responsive to the professional viewing a past request for an event DJ service and selecting an option to configure automatic generation of a quote. In another embodiment, the interface 1105 is provided responsive to the professional selecting an option to automatically configure a quote for event DJ requests. Upon selecting the element 1110, the interface 1205 is provided to the user. The interface 1205 is configured to receive input that allows the professional to define the type of requests in which that professional is interested in quoting. As will be described in greater detail later herein, this information is used by the matching module 150 when determining which requests (received from customers) match this professional. For purposes of description, the parameters configured by the professional to define the types of requests in which the professional is interested in quoting are referred herein as request matching preferences. As will be described in greater detail later herein, the request matching preferences are used when determining if a request (which includes a set of parameters referred herein as request preferences) matched for this professional.

The interface 1205 is shown in several FIGS. 12A-12G. As shown in FIG. 12A, the interface 1205 is configured to receive input from the professional for providing travel preferences 1210. For instance, the interface 1205 includes an element 1212 indicating that the professional travels to the customer, an element 1214 indicating that customers travel to the professional, and an element 1216 indicating that the service is performed remotely (e.g., phone or internet). As illustrated in FIG. 12A, the professional has selected element 1212 indicating that the professional is interested in responding to requests where the professional travels to the customer.

FIG. 12B shows a portion of the interface 1205 configured to receive input from the professional defining the types of events that the professional is interested in responding to requests. The interface 1205 includes a list of predefined DJ event types 1220 including birthday party, wedding, corporate event, prom/school dance, graduation party, summer party, family reunion, anniversary party, and engagement party. As illustrated in FIG. 12B, the elements 1221-1229 have each been selected thereby defining that the professional is interested in responding to requests where the DJ event type is a birthday party, wedding, corporate event, prom/school dance, graduation party, summer party, family reunion, anniversary party, or an engagement party.

FIG. 12C shows a portion of the interface 1205 that is configured to receive input from the professional defining whether the professional is interested in responding to requests where certain additional equipment or services have been indicated as needed, and defining whether the professional is interested in responding to requests depending on whether the venue provides the sound equipment. As illustrated in FIG. 12C, the interface 1205 includes a list of predefined additional equipment or services needed for the event including element 1231 representing MC service, element 1232 representing microphones, element 1233 representing lighting, and element 1234 representing a fog machine. In this example, elements 1231-1234 have been selected thereby defining that the professional is interested in responding to requests where any of those equipment or services have been indicated as being needed. The interface 1205 also allows the professional to define whether the professional is interested in responding to requests that specify that the venue provides sound equipment and/or that the DJ must provide the sound equipment. In this example, element 1236 and element 1237 have each been selected thereby defining that the professional is interested in responding to requests where either the venue provides sound equipment or the DJ must provide the sound equipment.

FIG. 12D shows a portion of the interface 1205 that is configured to receive input from the professional defining the duration of the event in which the professional is interested in responding. The interface 1205 includes a list of predefined durations including 1 hour, 2 hours, 3 hours, 4 hours, 5 hours, 6 hours, 7 hours, 8 hours, and more than 8 hours. In this example, elements 1241-1249 have been selected thereby defining that the professional is interested in receiving requests that specify any of the durations between 1 hour and more than 8 hours respectively.

FIG. 12E shows a portion of the interface 1205 that is configured to receive input from the professional defining the professional's interest in responding to requests that specify an indoor or outdoors preference, and the number of guests. In this example, elements 1251-1253 have each been selected thereby defining that the professional is interested in responding to requests that specify that the event is indoors, outdoors, or they are not sure yet, respectively. Elements 1254-1259 have each been selected thereby defining that the professional is interested in responding to requests that specify the number of guests to be 25 or fewer, 25-50, 51-100, 100-150, 150-200, or more than 200 guests, respectively.

FIG. 12F shows a portion of the interface 1205 that is configured to receive input from the professional defining the professional's interest in responding to requests with different age of guest ranges. As shown in FIG. 12F, the interface 1205 includes a list of predefined age ranges 1260 including 12 years or younger, 13-17 years, 18-30 years, 31-50 years, and 51 or older. In this example, elements 1261-1265 have each been selected thereby defining that the professional is interested in responding to requests that specify the age of guests to be 12 years or younger, 13-17 years, 18-30 years, 31-50 years, or 51 or older, respectively.

FIG. 12G shows a portion of the interface 1205 that is configured to receive input from the professional defining the professional's interest in responding to requests with different music preferences. As shown in FIG. 12G, the interface 1205 includes a list of predefined music preferences 1270 including pop, rock, R&B/soul, Hip-hop/rap, EDM/house, top 40, Latin, and country. In this example, elements 1271-1278 have each been selected thereby defining that the professional is interested in responding to requests that specify a music preference of pop, rock, R&B/soul, Hip-hop/rap, EDM/house, top 40, Latin, or country, respectively.

Although FIGS. 11-12G illustrate an example interface of a professional configuring the request matching preferences for a single type of request, it should be understood that the configuration module 145 is adapted to receive request matching preferences from a professional for multiple types of requests and/or multiple different combination of request matching preferences. The request matching preferences are stored in the data store 160 in association with an account of the professional and uniquely identifiable.

Figure 13:
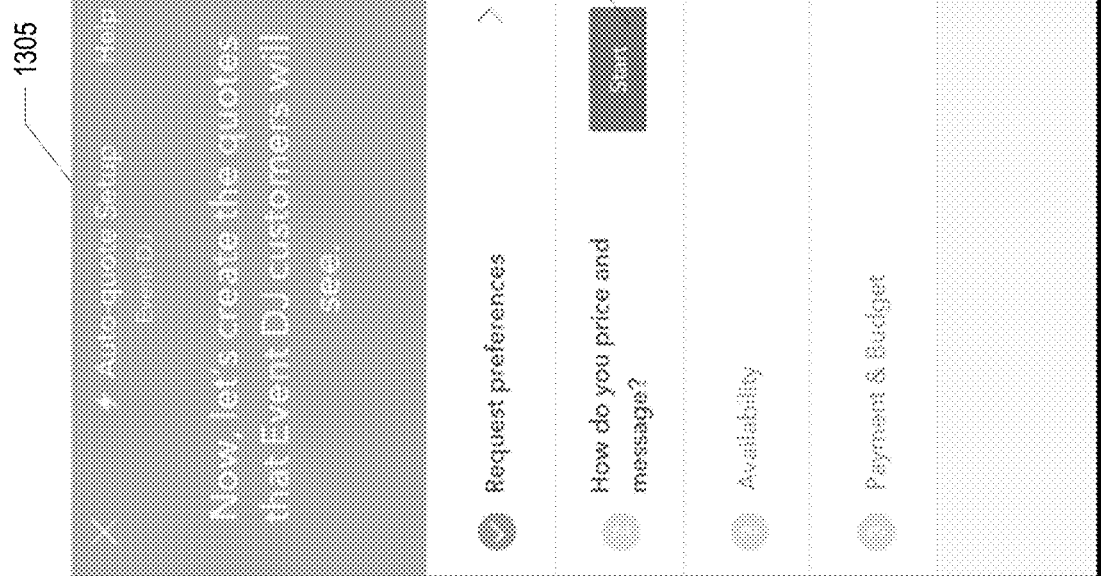
FIG. 13 illustrates an exemplary interface that begins a series of interfaces of the response configuration module shown in FIGS. 14-20 for the professional to configure pricing and messaging for automatic generation of quotes, according to an embodiment.

In addition to defining the request matching preferences, the configuration information for automatic generation of quotes includes pricing and messaging configuration information, in an embodiment. FIG. 13 illustrates an interface 1305 that begins a series of interfaces of the response configuration module 140 shown in FIGS. 14-20 for the professional to configure pricing and messaging for automatic generation of quotes, according to an embodiment. The pricing and messaging configuration information is stored in the data store 160 and uniquely identifiable (e.g., through a unique identifier). For purposes of description, the pricing and messaging configuration information stored in the data store 160 is sometimes referred herein as a response sheet.

The pricing and messaging configuration information shown in the example of FIGS. 13-20 applies to the request matching preferences configured in FIGS. 11-12G. It should be understood that pricing and messaging configuration information may be configured by a professional for multiple different request matching preferences. In addition, it should be understood that the pricing and messaging configuration information may be defined independently from the request matching preferences and selectively apply to different elements of the request matching preferences. That is, multiple response sheets may be configured for the same set of request matching preferences. For instance, if the request matching preferences for an event DJ include top 40 music and country music, the professional may configure a response sheet for top 40 music and a response sheet for country music (e.g., the messaging may be different between the two).

Figure 14:
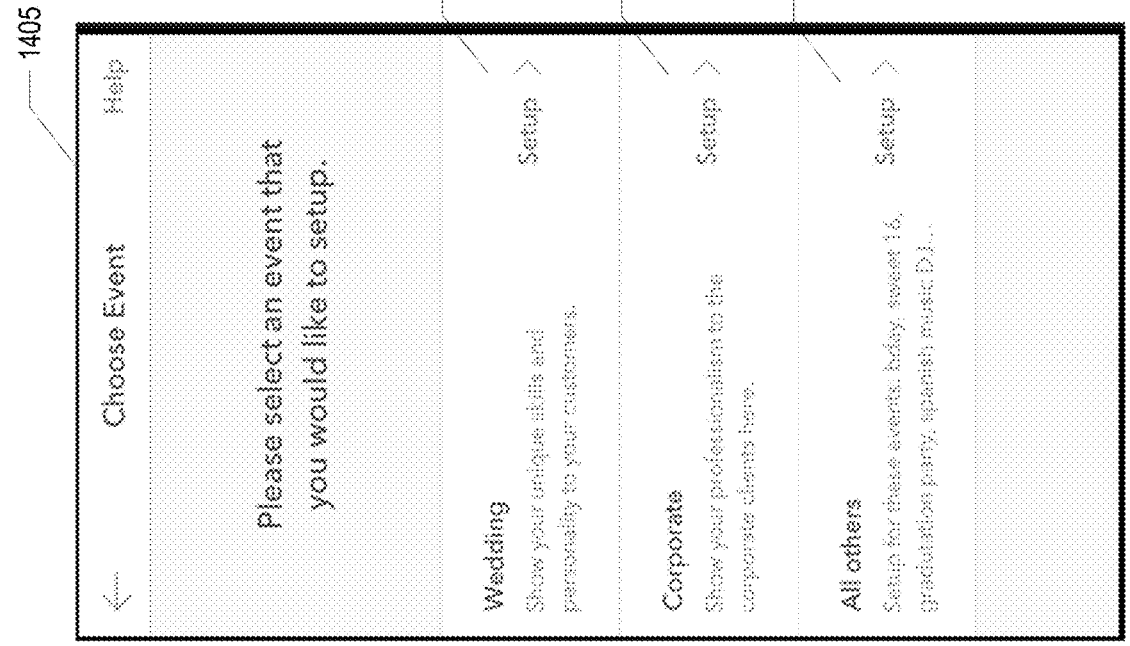
FIG. 14 illustrates an exemplary interface that is configured to receive input for selecting the type of event for configuring pricing and messaging, according to an embodiment.
Figures 15, 16:
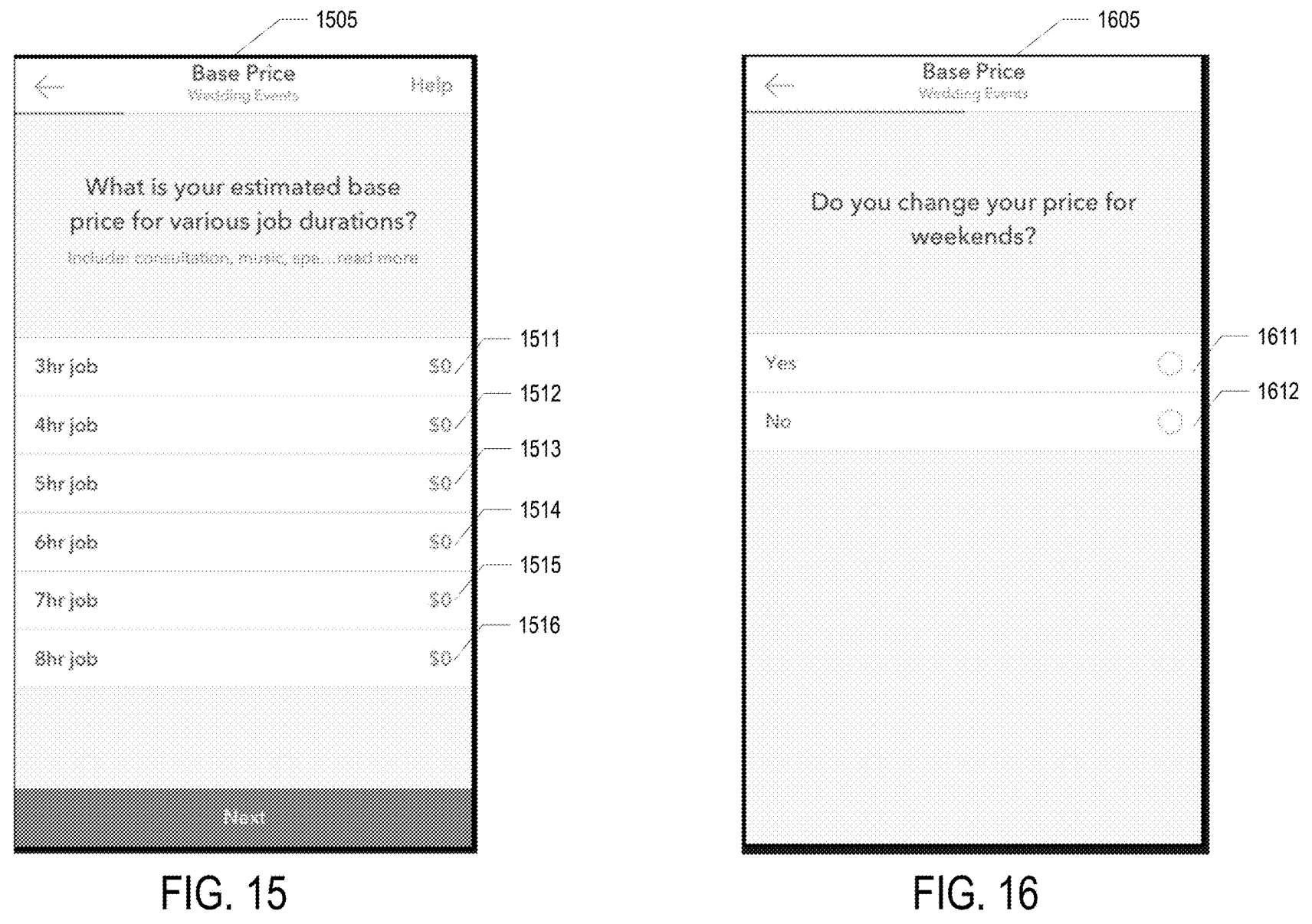

Responsive to selecting the element 1310, the interface 1405 of FIG. 14 is provided to the user. The interface 1405 is configured to receive input for selecting the type of event for configuring pricing and messaging. The interface 1405 includes a list of types of events that can be selected, including the element 1410 corresponding to a wedding event, element 1415 corresponding to a corporate event, and element 1420 corresponding to other events. The type of events that can be selected by the professional correspond with the type of events previously defined by the professional as those in which the professional is interested in responding (e.g., in FIG. 12B). In this example, input is received to select element 1410 corresponding to a wedding event. Responsive to selecting element 1410, the interface 1505 of FIG. 15 is provided to the user.

Figures 17, 18:
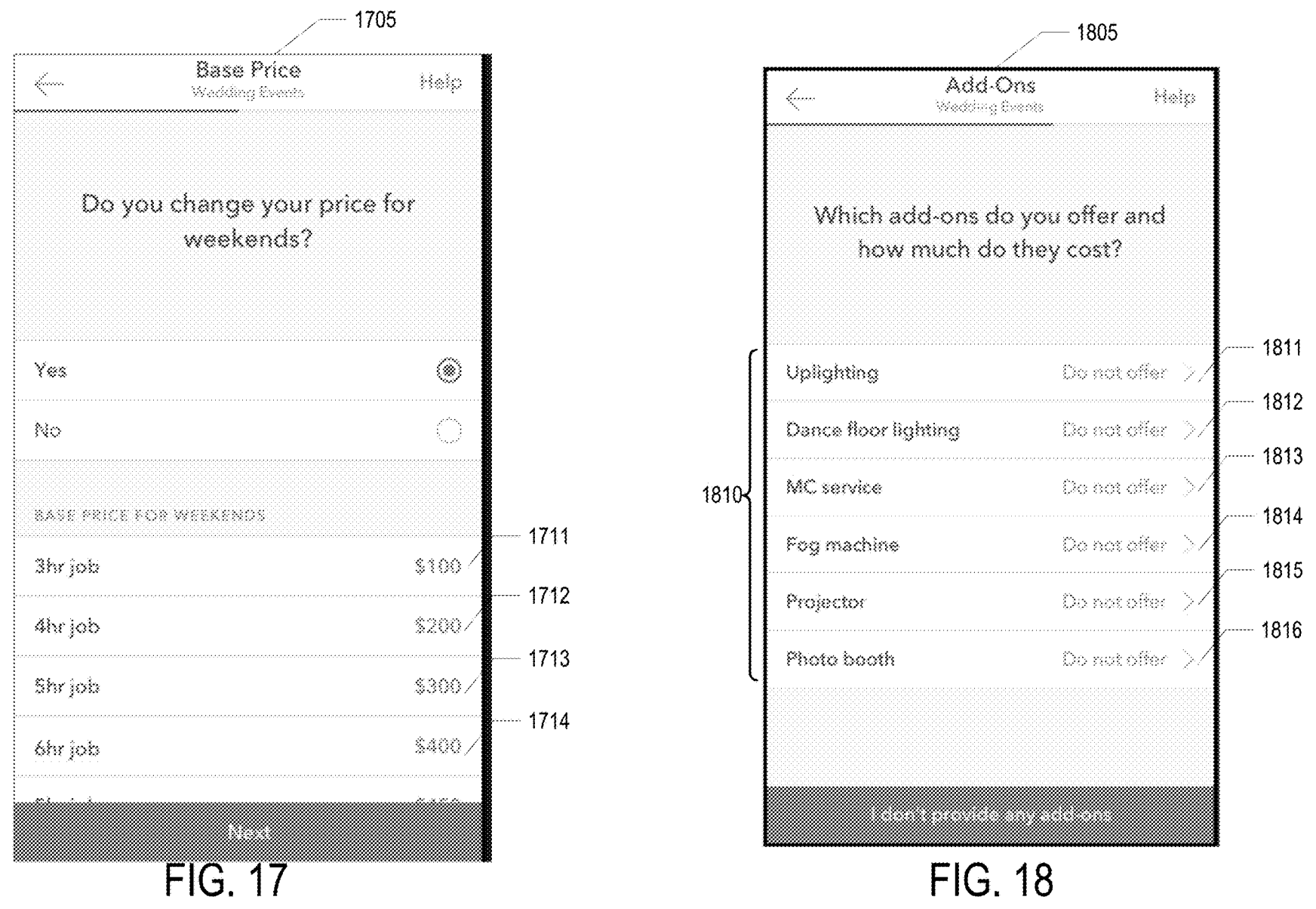

In an embodiment, the pricing for a service includes a base price and may include pricing for add-ons that are offered. The base price may be adjusted for different time durations and adjusted based on date (e.g., weekends, holidays, etc.). FIG. 15 shows an interface 1505 that is configured to receive input from the professional to define the base price for a service, in this example a wedding event. The interface 1505 includes a list of durations of the event including 3 hours, 4 hours, 5 hours, 6 hours, 7 hours, and 8 hours, represented by elements 1511-1515 respectively. FIG. 16 illustrates an interface 1605 that is configured to receive input from the professional to define whether the price is different on the weekends. The interface 1605 includes element 1611 indicating that the price is different on the weekends, and the element 1612 indicating that the price is not different on the weekends. If the element 1611 is selected, the interface 1705 of FIG. 17 is provided to the professional that is configured to receive input from the professional to define the base price for a service on the weekends, in this example a wedding event. The interface 1705 includes a list of durations of the event including 3 hours, 4 hours, 5 hours, and 6 hours, represented by elements 1711-1714 respectively.

Figure 19:
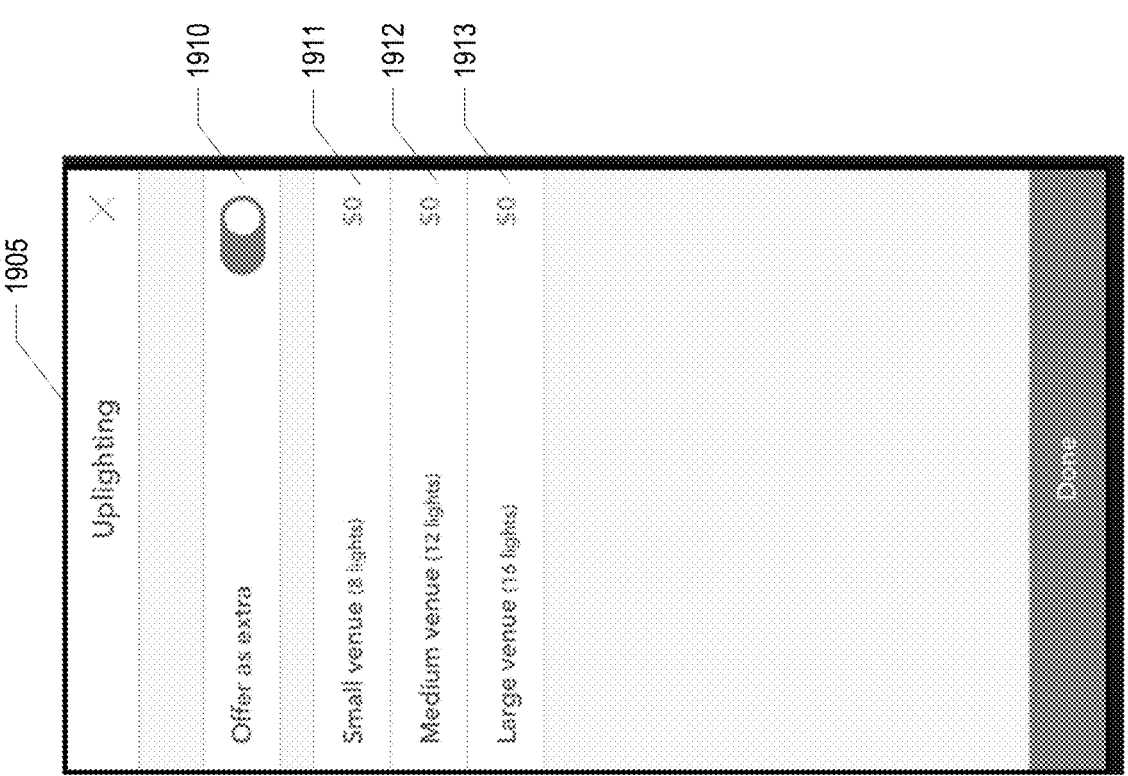
FIG. 19 illustrates an exemplary interface that is configured to receive input from the professional to define the price of an add-on, according to an embodiment.

FIG. 18 shows an interface 1805 that is configured to receive input from the professional to define whether any add-ons are offered and how much they cost. The interface 1805 includes a set of predefined add-ons 1810 that depend on the type of service being provided by the professional. In the example of FIG. 18, the set of predefined add-ons 1810 include the elements 1811-1816 representing uplighting, dance floor lighting, MC service, fog machine, projector, and photo booth, respectively. Selection of a particular one of the elements 1811-1816 causes another interface to be provided to the professional for configuring the price for that particular add-on. For example, FIG. 19 shows an interface 1905 that is configured to receive input from the professional to define the price of an add-on, in this example the price for an uplighting add-on for a wedding event. The interface 1905 includes a toggle element 1910 for toggling whether the uplighting add-on is offered, and if so, the elements 1911-1913 for configuring the price for the add-on for a small venue, medium venue, and large venue respectively.

Figure 20:
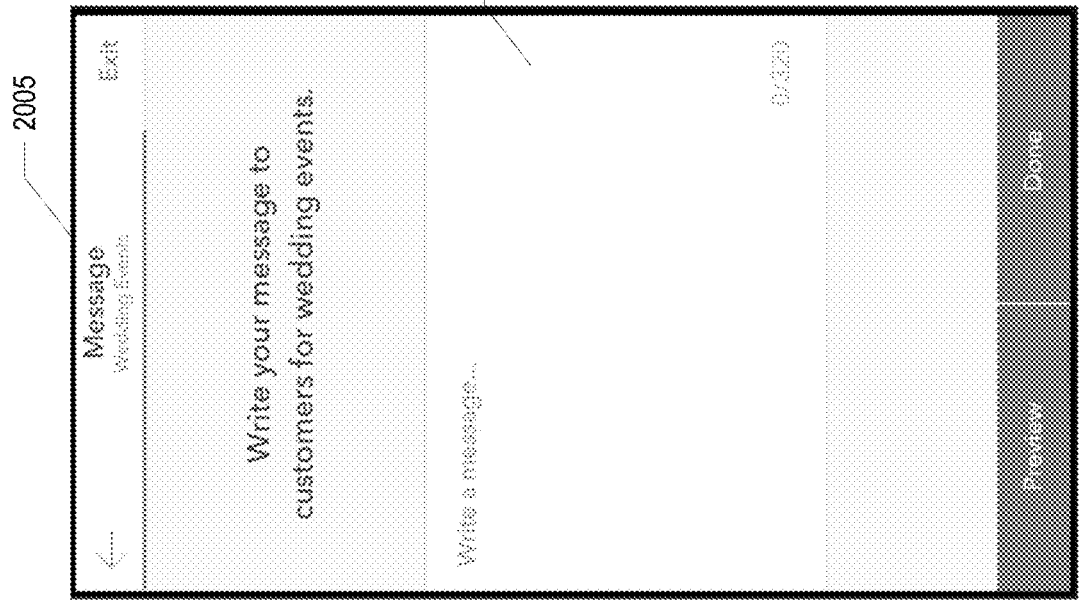
FIG. 20 illustrates an exemplary interface that is configured to receive input from the professional to define a message that is included in the quote to a customer, according to an embodiment.

FIG. 20 shows an interface 2005 configured to receive input from the professional to define a message that is included in the quote to a customer, in this example a wedding event. The interface 2005 includes a text field 2010 that is configured to allow the professional to write a message that will be included in the quote to a customer.

Although FIGS. 14-20 illustrate an example of a professional configuring a response sheet to match against a single request service type (in this example a wedding DJ event), it should be understood that the configuration module 145 is adapted to allow the professional to configure multiple response sheets.

Figure 21:
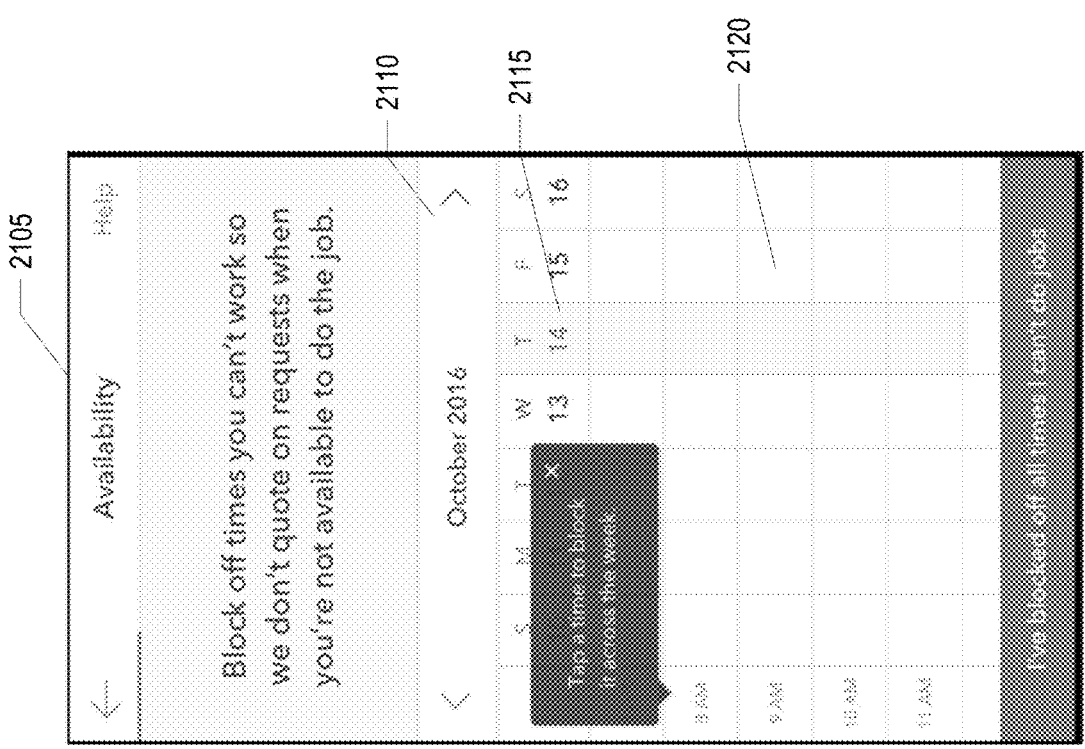
FIG. 21 illustrates an exemplary interface that is configured to receive input from the professional defining the availability of the professional, according to an embodiment.

In an embodiment, the configuration for automatic generation of quotes includes configuring availability of the professional. FIG. 21 illustrates an exemplary interface 2105 configured to receive input from the professional defining the availability of the professional. The interface 2105 allows the professional to block off unavailable times. The interface 2105 includes a month/year selector 2110 that is configured to receive input on the month/year. The interface 2105 includes a day selector 2115 that allows the professional to block off an entire day by selecting the top cell in a column. The interface 2105 also includes a cell selector 2120 that allows the professional to block off certain times (e.g., 1 hour increments) using the calendar. Although FIG. 21 illustrates an interface that allows a professional to configure unavailable times, in another embodiment an interface is configured to receive input from the professional specifying their available times. In an embodiment, the system automatically updates the calendar with unavailable times based on confirmed jobs.

Figure 22:
FIG. 22 illustrates an exemplary interface that is configured to receive input from the professional for configuring a quote budget, according to an embodiment.

In an embodiment, the configuration for automatic generation of quotes includes configuring how many quotes can be generated on behalf of the professional (sometimes referred herein as the quote budget). The quote budget may be an overall budget or may be a recurring budget over a period of time (e.g., a quote budget per day, per week, per month, etc.). In an embodiment, the number of quotes generated on behalf of a professional over a given time period may be for more jobs than that professional has current capacity to fulfill, if it is determined that the professional on average does not typically get hired for every quote that is generated. In an embodiment, professionals are charged when an automatic quote is placed on their behalf. In another embodiment, the professionals are charged when a customer makes a contact (e.g., sends a message, places a phone call through the platform, etc.) in response to an automatic quote being placed on their behalf. FIG. 22 illustrates an exemplary interface 2205 configured to receive input from the professional for configuring a quote budget, in this example for an event DJ. The interface includes element 2210 that is configured to receive input from the professional that allows the professional to input the maximum budget for quotes for the week. The interface 2205 also includes the element 2215 which is a calculation of the amount of customer responses that the professional is likely to receive during that week.

In an embodiment, the configuration information includes information to configure a set of one or more response templates (referred to as response template configuration information). Each template may be configured with a set of one or more matching preferences that allow the system to automatically select the best template for responding to a particular request. That is, different templates may be selected for different requests (depending on the data contained in the request). Each template may be configured with a set of one or more placeholder values that are automatically populated by the system with values included in the request. The system automatically selects the template that is determined to be the best template for generating the response (e.g., the template that most closely matches the request) by using, for example, data from the request and the set of matching preferences of each template.

The response template configuration information defines the parameters of the template. The response template configuration information may specify, for each template, a message field and/or attachment(s). The message field of the response template may be customized by the responder. For instance, in an embodiment where the template is used by a professional for responding to a request for service, the template may include information including one or more of the following: the name of the professional, contact information of the professional (e.g., phone number, email address, social network username, etc.), a description of the qualifications of the professional, information about the price the professional estimates the requested job will cost, and other information that the professional wants to include to win the business of the customer.

The response template configuration information may specify a set of one or more matching preferences for each template. A matching preference is used by the response module 145 when selecting a template to use to respond to a request. In an embodiment, a matching preference includes a request field and corresponding a set of one or more expected values for matching. The request field of a matching preference is based on the request field used by the requester when submitting the request. By way of example, for a request for the services of a DJ for an event, the request may include a request field for the type of event (e.g. birthday party, wedding, corporate event, prom/school dance) and the set of one or more expected values used for matching. For instance, a DJ professional may configure a template for weddings, a separate template for birthday parties, and a separate template for other types of events. In the template for weddings, the matching preference may be: {event_type, wedding}; for the template for birthday parties, the matching preference may be: {event_type, birthday party}; and for the template for other events, the matching preference may be: {event_type, (corporate event, prom/school dance)}.

FIG. 23 illustrates an exemplary interface for a responder to configure a set of one or more matching preferences for a template, according to an embodiment. Although not illustrated in FIG. 23, the interface 2305 is specific for an event DJ template and may be provided by the template management module 130 in response to the responder specifying to configure or create an event DJ template. It should be understood that the predefined request fields and corresponding input value options for matching provided in the interface 2305 are exemplary and different request fields and input value options may be used. The interface 2305 includes a number of request fields that are used to match against a request, in this example a request for services of a DJ for an event. The interface 2305 includes a field 2310 for defining when this template is to be used, and a corresponding set of input value options 2312-2314 (respectively, never for event DJ requests, for event DJ requests that don't match a specific template, and for specific event DJ requests only). In the example shown in FIG. 23, the input value 2316 representing that the template is to be used for specific event DJ requests only, has been selected. The interface 2305 includes a set of one or more request fields 2318 that define the criteria upon which the template is to match against a request. The request field 2320 is for specifying the type of event this template is to match by selecting one or more of the corresponding input value options 2322-2328 (respectively birthday party, wedding, corporate event, and prom/school dance). In the example of FIG. 23, the input values 2324 and 2326 have been selected, representing a wedding and corporate event respectively. The request field 2330 is for specifying the music preferences this template is to match by selecting one or more of the corresponding input value options 2332-2336 (respectively pop, rock, and hip-op). In the example of FIG. 23, the input values 2332-2336 have each been selected, meaning that this template matches against all types of music preferences. The request field 2340 is for specifying the number of guests this template is to match by selecting one or more of the corresponding input value options 2342-2346 (respectively 25 or fewer, 26-50, and over 50). In the example of FIG. 23, the input values 2342 and 2344 have been selected, representing 25 or fewer guests and 26-50 guests. The request field 2350 is for specifying the extra services this template is to match by selecting one or more of the corresponding input value options 2352-2356 (respectively MC services, fog machine, and microphones). In the example of FIG. 23, the input value 2352 has been selected, representing MC services.

The response configuration module 140 may allow the responder to specify or edit a number of placeholder values in the message field that are automatically populated based on information in the request (if that template is used for generating a response). For instance, in a specific embodiment where the request is a request for service, example placeholder values include the requester name, the day of week, the date the job is requested, the type of service, and a description of the service. The location of the placeholder values in the message field may be configured by the responder. FIG. 24 illustrates an example interface that allows the responder to specify or edit a number of placeholder values in a template, according to an embodiment. FIG. 24 illustrates a template that is used for responding to a request for service. The interface 2410 may be provided by the response configuration module 140 in an editor (e.g., a what you see is what you get (WYSIWYG) type editor). The available placeholder fields may be inserted into the message body of the template (e.g., drag and drop from a sidebar listing the available placeholder fields). As shown in FIG. 24, the placeholder fields inserted into the template include the requester name field 2420, the service description field 2425, the service date field 2430, and the service description detail field 2435. The interface 2410 also allows the professional to specify the total price 2415 to be used for the template, and includes an attachment upload button 2450 to allow the professional to include any attachment.

In an embodiment, a template may be created automatically by the response configuration module 140 based on a previous request and/or submitted response of the responder. For example, the response configuration module 140 may analyze requests sent to the responder in which the responder submits a response (e.g., over a threshold value) and automatically generate a template that matches those requests. As another example, the response configuration module 140 may receive from the responder a selection of a previous response and automatically generate a template that matches similar requests in the future. In such an embodiment, automatically generating the template includes automatically setting the one or more matching preferences for the template according to the request values submitted by the requester. For example, with reference to FIG. 23, if the request indicates that the type of event for the DJ is a wedding, then automatically setting the one or more matching preferences for the template includes setting the value of the request field 2320 to correspond to a wedding event.

Referring back to FIG. 2, after receiving the configuration information in operation 210, the response configuration module 140 causes the information to be stored in the data store 160 at operation 215. Flow then moves to operation 220.

At operation 220, the request processing module 120 of the server 125 receives the request 175 from the customer device 105. The request 175 defines the parameters of what is being requested including a set of one or more request preferences. In a specific embodiment where the request is a request for service, the request defines the type of service requested, the location where the service is desired, a category of the desired service, and one or more request preferences. Flow moves from operation 220 to operation 225.

In an embodiment, the request 175 specifies that the customer desires to receive responses that have been automatically generated (as opposed to being manually generated). Thus instead of having to wait to receive a response that is largely manually generated, the customer can receive responses that have been automatically generated much more quickly. This leads to higher engagement rates of the customer since they can determine whether to respond in a shorter timeframe. This in turn leads to higher chances of a professional being hired, and a faster process to get the service completed.

FIG. 25 illustrates an exemplary interface that may be provided by the server 125 for a customer to submit a request for a DJ event service, according to an embodiment. The customer may have indicated that they need a DJ event service and the interface 2505 may be presented to the user. It should be understood that the predefined request fields and corresponding input value options provided by the interface 2505 are exemplary and different request fields and input value options may be used. The interface 2505 includes a number of request fields for the customer to define details of the requested service. The interface 2505 includes a request field 2510 for the kind of event that the customer is hosting, and a corresponding set of input value options 2512-2518 for the customer to specify the kind of event (respectively birthday party, wedding, corporate event, and prom/school dance). In the example shown in FIG. 25, the input value 2514 representing a wedding event has been selected. The interface 2505 includes a request field 2520 for specifying how many guests are expected at the event, and a corresponding set of input value options 2522-2526 for the customer to specify the kind of event (respectively 25 or fewer, 26-50, and over 50 guests). In the example shown in FIG. 25, the input value 2524 representing 26-50 guests has been selected. The interface 2505 includes a request field 2530 for specifying the type of music desired, and a corresponding set of input value options 2532-2536 for the customer to specify the type of music (respectively pop, rock, and hip-hop). In the example shown in FIG. 25, the input value 2532 representing pop music has been selected. The interface 2505 includes a request field 2540 for specifying additional equipment or services for the event, and a corresponding set of input value options 2542-2546 for the customer to specify the additional equipment or services (respectively MC services, fog machine, and microphones). In the example shown in FIG. 25, the input value 2542 and the input value 2546 respectively representing MC services and microphones have been selected. The interface 2505 includes a location field 2550 for specifying where the DJ is needed, and a corresponding input value field 2552 that allows the customer to specify the location.

Referring back to FIG. 2, at operation 225, the request processing module 120 selects the responder for responding to the request. In an embodiment, the request processing module 120 selects the responder for responding to the request using a matching process that selects the responder (and potentially a set of one or more other responders) for responding to the request. This matching process may include determining that the responder matches one or more parameters specified in the request. In a specific embodiment where the request is a request for service, this matching may include selecting the set of responders that match at least the requested location and category, and may be based on data analysis that indicates one or more of the following: a determined interest level of the professional in the request; a relevance of the professional to the customer; relatively short term supply and demand in the marketplace for the requested job; and relatively long term supply and demand in the marketplace. In another embodiment, instead of matching the request with a set of responder(s), the request itself specifies the responder(s). For instance, the server may be configured to allow the requester to view/browse a list of responder(s) (e.g., that match the requested location and category) and select the responder(s) directly. In this embodiment, the request processing module 120 selects the responder based on the identified responder in the request itself.

Figure 26:
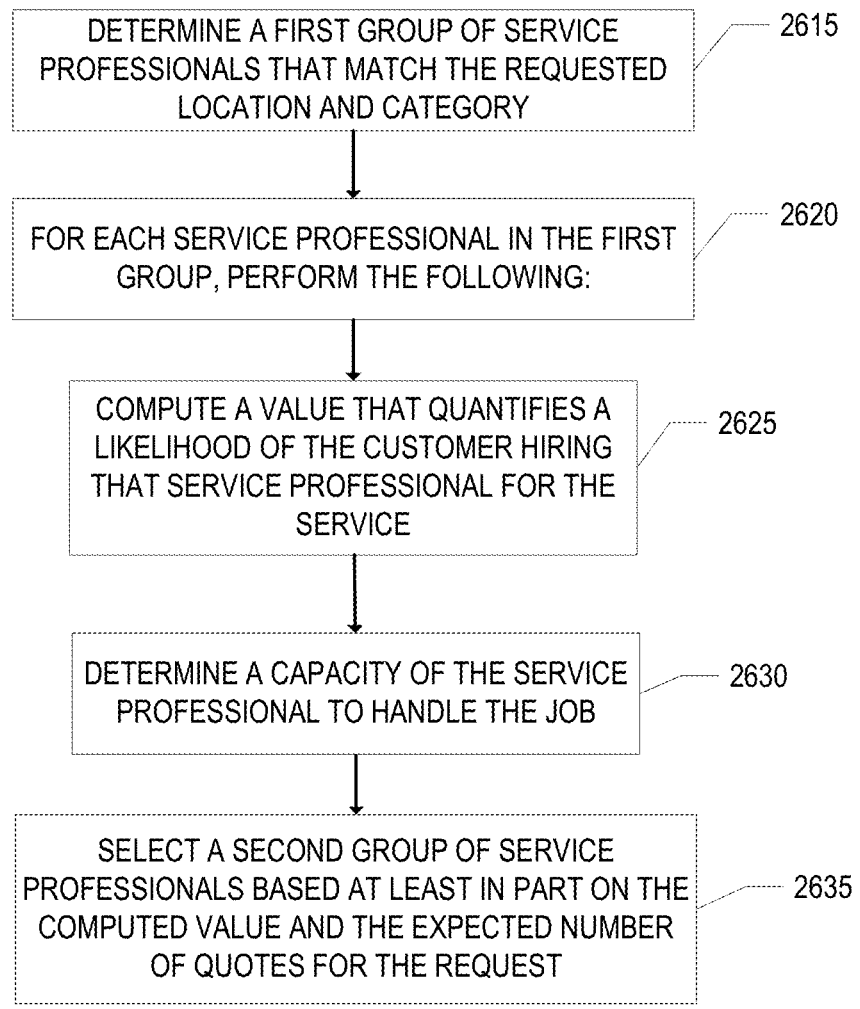
FIG. 26 is a flow diagram that illustrates exemplary operations for an improved system for matching customer requests with local service professionals according to an embodiment.

FIG. 26 is a flow diagram that illustrates exemplary operations for an improved system for matching customer requests with local service professionals according to an embodiment. The operations of FIG. 26 will be described with respect to the exemplary embodiment of FIG. 1. However, it should be understood that the operations of FIG. 26 can be performed by different embodiments than those discussed with FIG. 1, and the exemplary embodiment of FIG. 1 can perform different embodiments than those discussed with respect to FIG. 26. In an embodiment, the operations described with respect to FIG. 26 are performed during operation 225 to select the responder for responding to the request.

At operation 2615, the matching module 150 of the server 125 performs a first level of matching based on the requested location and category. Thus at operation 2615, the candidate selector 152 of the matching module 150 determines a first group of service professionals that match the requested location and category, which are sometimes referred to as candidate professionals. The matching module 150 accesses information about the professionals such as the location(s) that they offer service and the categor(ies) of service that they offer from the data store 160. The candidate selector 152 compares the requested location and category with the information from the data store 160 to select the candidate professionals. It should be understood that depending on the location and/or category, there may be many candidate professionals. Flow moves from operation 2615 to operation 2620.

After determining the candidate professionals, the matching module 150 of the server 125 performs a second level of matching to refine which professionals are selected for automatic quoting. The second level of matching is intended to determine which set of professionals are best suited for the job, and may take the following factors into consideration: the customer's requirements for the job, the professional's express intent and derived interest in doing the job, the qualification of the professional for the job, whether the professional is a good fit for what the customer is looking for (e.g., for jobs involving personal preferences or style, such as interior design jobs), whether the customer is a good fit for the professional and is likely to deliver value to the professional's business, maximizing fulfillment of requests, and/or maximizing an overall aggregate measure of relevance across a plurality of requests. At operation 2620, the selection limiter 154 of the matching module 150 performs operations 2625-2630 for each professional in the first group of professionals (the candidate professionals).

At operation 2625, the selection limiter 154 computes a value that quantifies a likelihood of the requesting customer hiring that service professional for the service, if a quote was given. The computation of this value may be based on the estimated quality of the professionals to the customer and may use a logistic regression model. By way of example, the logistic regression model may use one or more signals derived from data of the system including reviews of the professionals, non-review related profile features, response time of the professionals, previous hire rate of the professionals, distance between the requested location and the professional, non-professional-specific features, and/or information from the perspective quote itself such as the price that would be offered to perform the requested job.

Through an empirical data analysis, the number of reviews of a professional is correlated with the hire rate of the professional. Similarly, the rating of the reviews is also correlated with the hire rate of the professional. To say it another way, professionals that have a relatively large number of reviews and are rated relatively high tend to be hired at a larger rate than professionals with a relatively low number of reviews and/or low rating. Moreover, the number of and rating of verified reviews (those that have been verified as coming from a customer that hired the professional) may correlate with the hire rate of the professional.

Non-review related profile features of the professional may be correlated with the hire rate of the professional, such as the existence of a profile picture, the number of profile pictures, the number of videos, profile completion status, the number of hires of the professional, the length of the service description, whether the professional has passed a background check, and/or whether the professional shows proof of being licensed. For instance, professionals with profile picture(s) may have a larger hire rate than those professionals that do not have profile picture(s). Also, the number of pictures can have a correlation with hire rate. For instance, the hire rate of professionals tends to go up until about 5 pictures where the hire rate levels off. The number of videos of a professional may be correlated with the hire rate of the professional depending on the category of service provided. Whether a professional has passed a background check may impact hire rate depending on the service category. For example, professionals that have passed a background check may have a larger hire rate in service categories that concern children (e.g., babysitting, tutoring, music lessons, etc.). Professionals that have evidence of being licensed may have a larger hire rate than other professionals in certain categories (e.g., wellness, personal, pets).

The response time of a professional is correlated with the hire rate. For instance, how quickly the professional responds to messages or questions from a customer impacts the hire rate. That is, professionals that respond more quickly have a larger hire rate than other professionals. The response time may be weighed more heavily in recent time windows and/or only viewed in a certain time window. For instance, the average response time in the past year (or other predefined time period) may be used.

The previous hire rate is generally correlated with the current hire rate. That is, the hire rate of professionals for a service category generally tends to stay roughly linear. The number of previous hires over a given time period (e.g., over the last year) may be used.

The distance between the requested location and the professional may impact hire rate. For instance, hire rate generally goes down as distance increases. This value may be dependent on whether the customer travels to the professional for the job, whether the professional travels to the customer for the job, or whether the job is done remotely. In cases where the customer travels to the professional for the job, the hire rate may generally go down as distance increases. In cases where the professional travels to the customer for the job, the hire rate may generally go down as distance increases, but generally not as much as if the customer travelled to the professional. In cases where the job may be done remotely, the distance between the requested location and the professional may not impact the hire rate.

Non-professional-specific features such as the historical hire rate in the category (across all professionals) is generally the same as the expected hire rate in the category.

Information from the perspective quote, such as the price that would be offered to perform the requested job, may also impact the hire rate. For instance, a professional that is offering a price for the service that is much higher or much lower than other professionals in the same category may negatively impact the hire rate.

Next, at operation 2630, the selection limiter 154 determines a capacity of the service professional to handle the job. The total capacity may be provided by the service professional and monitored by the matching module 150. For instance, the professional may specify how many jobs they can perform over a period of time (e.g., per day, per week, per month, etc.) and the server may track how many jobs the professional has taken over that period of time. In an embodiment, the professionals are charged when an automatic quote is placed on their behalf. In another embodiment, the professionals are charged when a customer makes a contact (e.g., sends a message, places a phone call through the platform, etc.) in response to an automatic quote being placed on their behalf. In such embodiments, instead of, or in addition to, specifying how many jobs a professional can take over a period of time, the professional may specify a quote budget that indicates how many quotes can be generated on their behalf. The quote budget may be an overall budget or may be a recurring budget over a period of time (e.g., a quote budget per day, per week, per month, etc.). In an embodiment, the number of quotes generated on behalf of a professional over a given time period may be for more jobs than that professional has current capacity to fulfill, if it is determined that the professional on average does not typically get hired for every quote that is generated. The server tracks the quote budget and determines whether the service professional has capacity to perform the job. Flow moves from operation 2630 to operation 2635.

At operation 2635, the selection limiter 154 selects a second group of service professionals based at least in part on the computed value and the capacity of the professionals. For instance, the selection limiter 154 may rank the professionals that have capacity to perform the job by the likelihood of the customer hiring the professional, and select the second group of professionals according to that ranking. As another example, the selection limiter 154 may distribute the quotes across multiple requests and/or expected requests. For instance, the selection limiter 154 may select the members of the second group of service professionals to maximize the chances to fill all customer requests (existing and expected) over a given period of time (e.g., daily, weekly, monthly). For instance, consider a case where a market has two tutoring professionals that can each take one tutor job per week where the first professional can tutor math only and the second professional can tutor math and chemistry. If the math tutoring job is taken by the second professional during the week, then there is no one in the market that can perform the chemistry job during that week. On the other hand, if the math tutoring job is taken by the first professional during the week, then a chemistry job may be taken by the second professional. As another example, the selection limiter 154 may select the members of the second group of service professionals to maximize the relevance of the professionals' quotes to customers over a longer period of time by forecasting future customer needs and using the forecast to maximize an overall aggregate measure of relevance across many requests (e.g., all requests in a market over a week).

Figure 27:
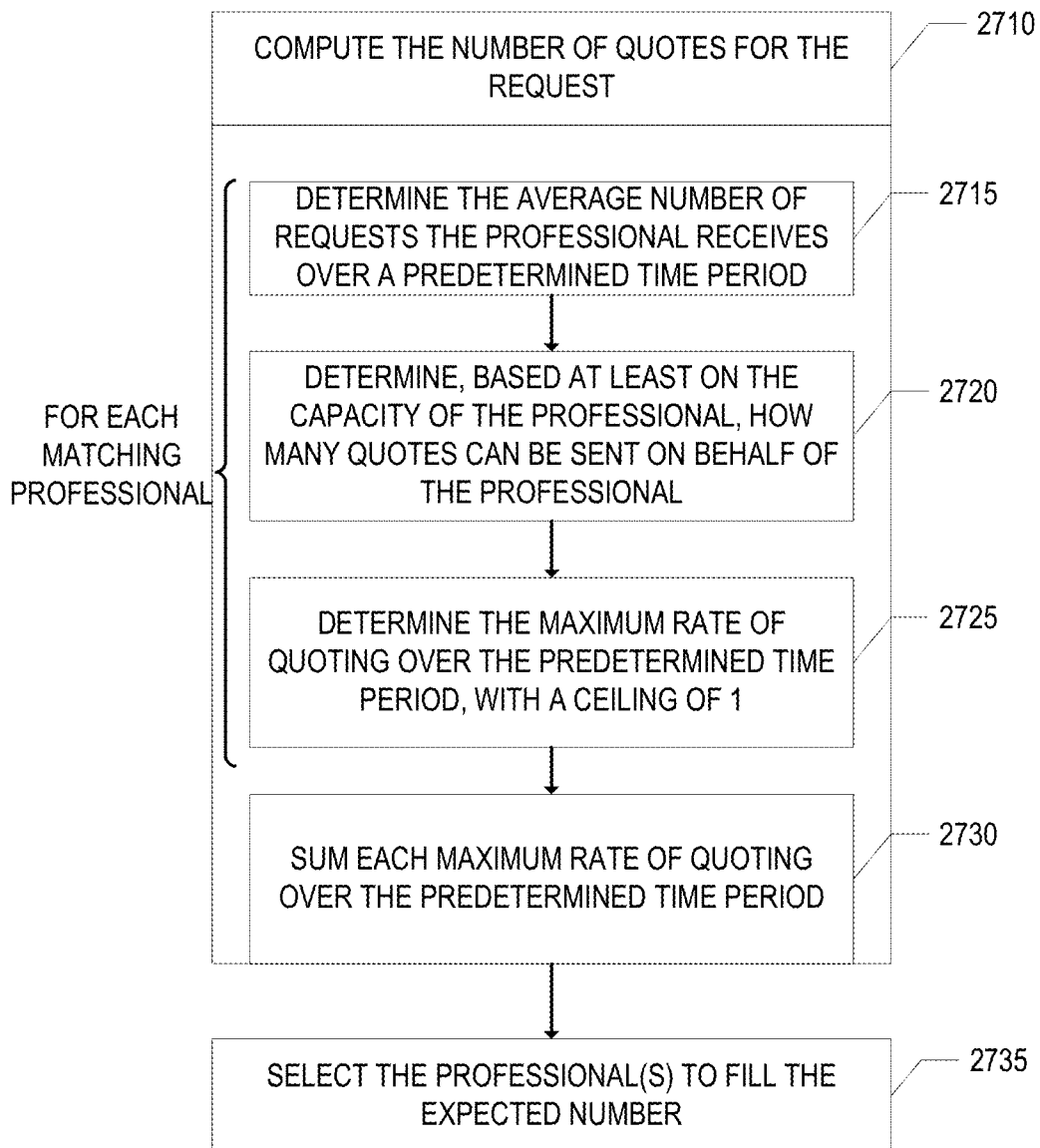
FIG. 27 is flow diagram that illustrates exemplary operations for selecting a second group of service professionals according to an embodiment.

FIG. 27 is flow diagram that illustrates exemplary operations for selecting a second group of service professionals according to an embodiment. For instance, the operations of FIG. 27 may be performed during the operation 2635. At operation 2710, the selection limiter 154 computes the number of quotes for the request. The number of quotes for the request may be determined as a function of the number of professionals that are eligible and have capacity for the job, the aggregate of the number of hired jobs over quotes for the requested category (that is, the average of how many quotes turn into hired jobs for the requested category), and the expected number of future requests for the requested category.

In an embodiment, computing the number of quotes for the request includes performing operation 2715-2730. The operations 2715-2725 are performed for each professional that matched the first level of matching. At operation 2715, the selection limiter 154 determines the average number of requests the professional receives or has been determined to match (e.g., after the second level of matching) in the requested category over a predetermined time period (e.g., per day, per week, per month, etc.). Next, at operation 2720, the selection limiter 154 determines, based at least on the capacity of the professional, how many quotes can be sent on behalf of the professional. As previously described, the number of quotes sent on behalf of the professional over a given time period may be higher than the capacity of the professional over that time period. The selection limiter 154 may determine the average rate at which the professional gets hired over the number of quotes sent over the predetermined time period. The maximum number of quotes may be set as the capacity of the professional divided by the average hire rate of the professional. For instance, if the capacity of the professional for a week is 5 jobs and the average hire rate of the professional is 0.5, the maximum number of quotes that can be sent on behalf of the professional may be 10. Next, at operation 2725, the selection limiter 154 determines the maximum rate of quoting over the predetermined time period, with a ceiling of 1. For instance, the maximum rate of quoting may be calculated as the maximum number of quotes over the average number of requests the professional receives over the predetermined time period. For instance, if the professional receives 15 requests on average over the predetermined time period and the maximum number of quotes over that time period is calculated to be 10, the maximum rate of quoting over the time period may be 10/15. Next, at operation 2730, the selection limiter 154 determines the sum of each maximum rate of quoting for each professional as found in operation 2725, which is the computed number of quotes for the request. By way of example, if each professional had a maximum rate of quoting as 1, the sum of each maximum rate of quoting would be equal to the number of professionals that matched the first level of matching.

In an embodiment, the selection limiter 154 may limit the number of quotes to a predefined number (e.g., up to five quotes), and/or reserve a number of quotes for those professionals that have recently registered for the system (e.g., within a predefined period of time such as 30 days) and/or have recently begun offering service for the requested category in the requested location (e.g., within the predefined period of time).

After computing the number of quotes for the request, flow moves to operation 2735 where the selection limiter 154 selects the professional(s) to fill the number of quotes. The selection of the professionals may be based on a ranking of the professionals and may be randomized. For instance, the ranking of each professional may be the same as described in operation 2625, and may be weighed based on the maximum rate of quoting over the predetermined time period found in operation 2725 (e.g., the computed value that quantifies a likelihood of the requesting customer hiring that service professional multiplied by the maximum rate of quoting over the predetermined time period). The resulting values for the professionals may be ranked and the quotes may be generated for the highest ranking professionals. A weighted random sampling may also be applied to produce randomness, such as according to the A-ES algorithm of Efraimidis and Spirakis.

Referring back to FIG. 2, after the responder is selected for responding to the request, flow moves to operation 230, which is optional in some embodiments, where the response module 145 automatically selects, from the response template(s) for the responder stored in the data store 160, a response template. The response module 145 may perform a matching process to determine the best template to select for generating a response to the request 175. The matching process may include comparing information included in the request 175 against each of the templates for the responder stored in data store 160 and determining which template best matches the information in the request. Determining which template best matches the information in the request may include performing a scoring process where each of the response templates are scored based at least on the comparison of the request values included in the request with the expected values of the matching preference configured for that template. The scoring process may incorporate historical analysis of the templates (for similar requests in the same category, for example) that reflects how each template performs. Example historical analysis may include: the rate at which requesters view a response generated from that template, the rate at which requesters respond to a response generated from that template, and/or the rate at which requesters select a responder to fulfill the request as a result of a response generate from that template. The template that has the highest score may be the template that is automatically selected. Automatically selecting the best template for generating a response reduces the time and effort for responders to respond to a request.

In an embodiment, the response module 145 may highlight or flag any information from the request that does not match the selected template. By way of example, if the request specifies use of a fog machine and the responder does not have access to a fog machine, the template selector may flag that to the responder that a fog machine was requested so that the responder may customize their response accordingly.

Figure 28:
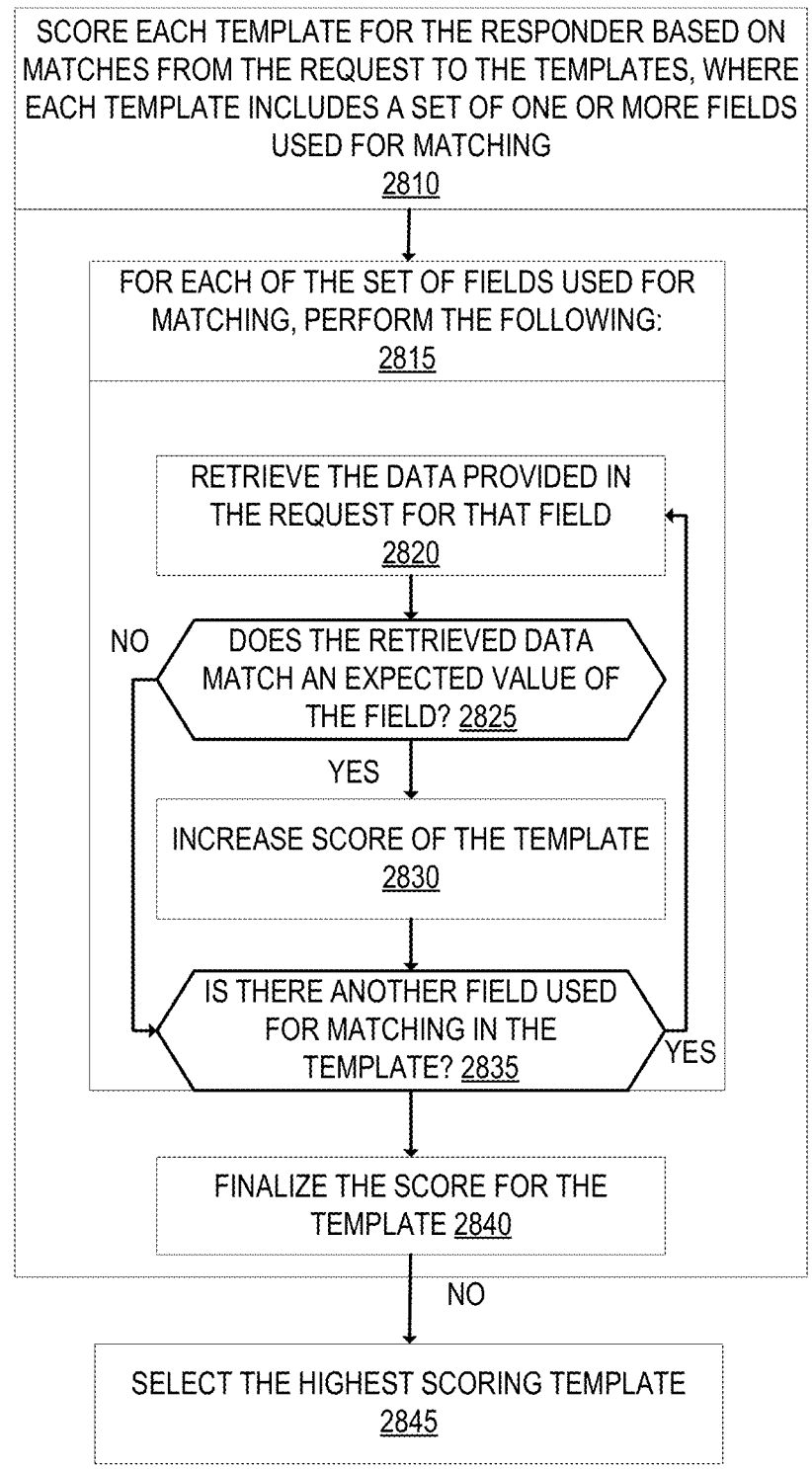
FIG. 28 is a flow diagram that illustrates exemplary operations for selecting a response template from multiple response templates for responding to a request, according to an embodiment.

FIG. 28 is a flow diagram that illustrates exemplary operations for selecting a response template from multiple response templates for responding to a request, according to an embodiment. The operations of FIG. 28 may be performed by the response module 145 when performing operation 230. At operation 2810, the response module 145 scores each template for the responder based on matches from the request to the templates, where each template includes a set of one or more fields used for matching (referred to as matching preferences). As previously described, each template for a responder includes a set of one or more matching preferences, which may be configurable by that responder. Example operations for scoring each template are described in operations 2815-2840.

At operation 2815, for each of the set of fields used for matching, the operations 2820-2835 are performed. At operation 2820, the data provided in the request for the field is retrieved. Next, at operation 2825, a determination is made whether the retrieved data matches an expected value of the field of the template. For instance, the response module 145 may determine whether the data provided in the request for the field is contained within the matching preference's input value set. If the retrieved data matches an expected value of the field, then flow moves to operation 2830 where the response module 145 increases the score of the template. In an embodiment, the amount the score is increased may be different for different fields, depending on an importance of that field to the responder. For instance, in an embodiment where the request is for a service, one of the fields may be for specifying the occasion for the service, and the responder may have different templates for different occasions. In such a case, the field specifying the occasion may be scored higher than other fields. If the retrieved data does not match an expected value of the field, then flow moves to operation 2835, where the response module 145 determines if there is another field used for matching in the template. If there is, then flow moves back to operation 2820, otherwise flow moves to operation 2840 where the score for the template is finalized. After each of the templates are scored, flow moves to operation 2845 where the response module 145 selects the highest scoring template.

Figure 29:
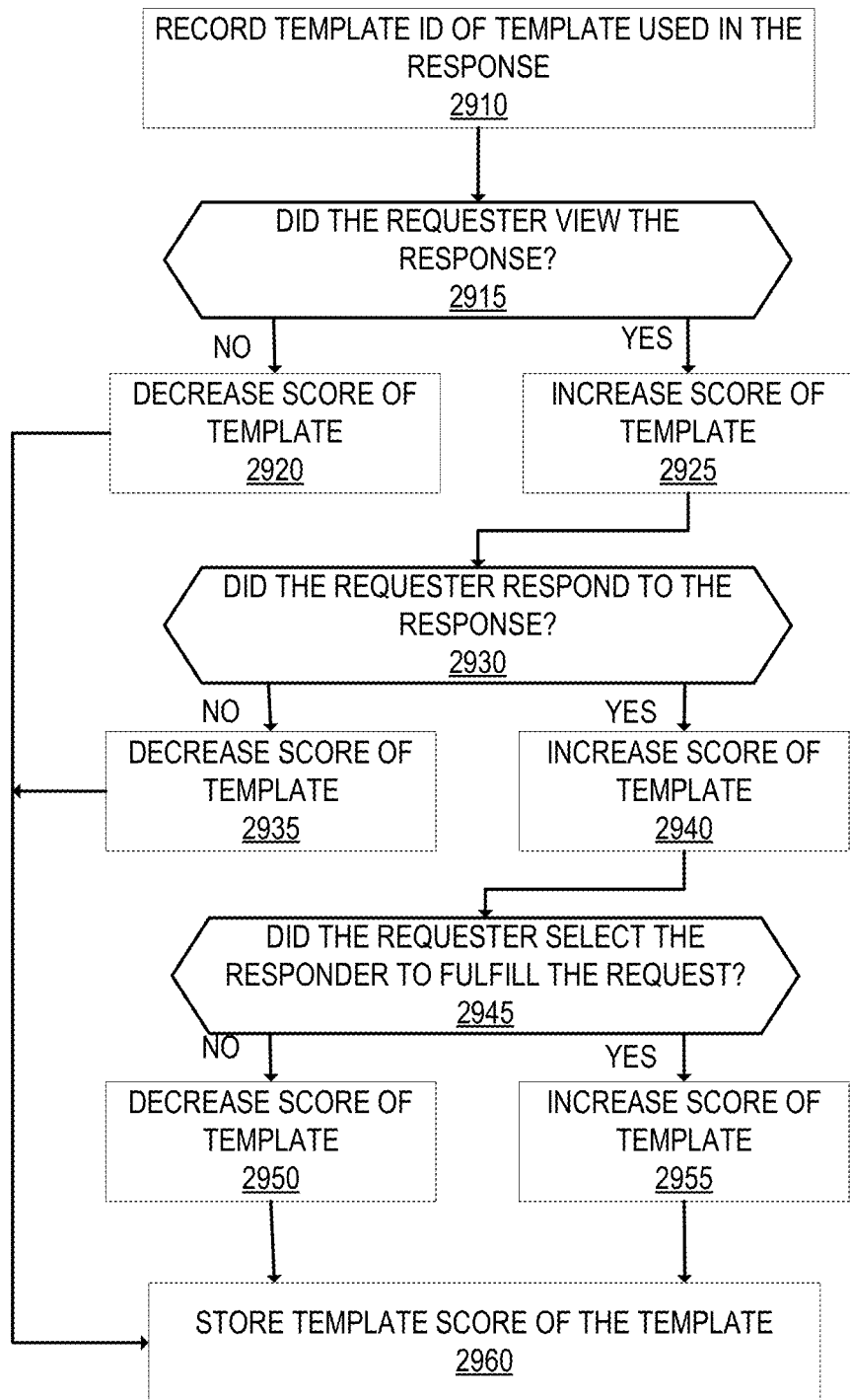
FIG. 29 is a flow diagram that illustrates exemplary operations for calculating the performance of each template of a responder, according to an embodiment.

In an embodiment, the matching process incorporates historical analysis of the templates that reflects how each template performs. FIG. 29 is a flow diagram that illustrates exemplary operations for calculating the performance of each template of a responder, according to an embodiment. The calculated performance may be used when selecting a response template for responding to a request. The operations of FIG. 29 may be performed by the response module 145. The operations of FIG. 29 can be performed in addition to, or in lieu of, the operations described with respect to FIG. 28.

The operations of FIG. 29 are based on information collected by the server 125 after submission of a response by or on behalf of a responder using a template. If no responses have been submitted through use of a template, the operations of FIG. 29 are not performed. In an embodiment, the operations of FIG. 29 are performed only after the number of responses that have been submitted by or on behalf of a responder using a template exceeds a threshold. At operation 2910, after submitting a response to a requester that was generated from a template, the response module 145 records an identifier associated to the template used in the response. This identifier is used to identify the template through different interactions with the system. For instance, the server 125 may record in the data store 160 the following information: whether the requester views the response generated by that template (e.g., opens an email link to the response that causes the response to be displayed, opens the response via a native application, and/or logs into an account on the server 125 and opens the response); whether the requester responds to the response (e.g., submits a message to the responder); and/or whether the requester selected the responder to fulfill the request (such as hired the responder).

Flow moves from operation 2910 to operation 2915, where the response module 145 determines whether the requester viewed the response (e.g., by accessing the information stored in the data store 160). If the requester did not view the response, then flow moves to operation 2920 where the score of the template is decreased, and flow moves to operation 2945. If the requester viewed the response, then flow moves to operation 2925 where the score of the template is increased.

Flow moves from operation 2925 to operation 2930 where the response module 145 determines whether the requester responded to the response (e.g., by accessing the information stored in the data store 160). If the requester did not respond to the response, then flow moves to operation 2935 where the score of the template is decreased and flow moves to operation 2945. If the requester responded to the response, then flow moves to operation 2940 where the score of the template is increased. The amount that the score is increased in operation 2940 may be different than the amount the score is increased in operation 2925.

Flow moves from operation 2940 to operation 2945 where the response module 145 determines whether the requester selected the responder to fulfill the request (such as by hiring the responder) (e.g., by accessing the information stored in the data store 160). If the requester did not select the responder for fulfilling the request, then flow moves to operation 2950 where the score of the template is decreased, and flow then moves to operation 2945. If the requester selected the responder for fulfilling the request, then flow moves to operation 2955 where the score of the template is increased, and flow moves to operation 2960, where the score of the template as calculated in operations 2915-2955 is stored in the data store 160.

The amount that the score is decreased in operations 2920, 2935, and/or 2950, may each be different. The amount that the score is increased in operations 2925, 2940, and/or 2955, may each be different. For instance, selecting the responder to fulfill the request may have the largest increase in the score; while not responding to the response (although viewing the response) may have the largest decrease in the score. Alternatively, instead of decreasing the score in operations 2920, 2935, and 2950, the response module 145 may keep the score for the template level, and increase the score in operations 2925, 2940, and 2955. As another alternative, instead of increasing the score in operations 2925, 2940, and 2955, the response module 145 may keep the score for the template level, and decrease the score of the template in operations 2920, 2935, and 2950.

The response module 145 may use the score of the template described in FIGS. 28 and 29 when selecting the template, in operation 230. For instance, the template matching score described in operation FIG. 28 may be combined (e.g., added) with the template performance score in operation FIG. 29 and the highest scoring template may be selected.

Referring back to FIG. 2, flow moves from operation 230 to operation 235 where the response module 145 automatically generates a response. The response is generated using at least some of the configuration information received from the professional. For instance, the response may specify the values configured by the professional that correspond to the request fields included in the request. The response may not include those values configured by the professional that do not correspond to the values in the request fields included in the request. For instance, as shown in FIG. 12B, the professional has provided information indicating many different types of events in which the professional provides service. If the request specifies a wedding event, however, the response may not specify that the professional provides services for all the types of events listed in FIG. 12B besides a wedding event.

If a template was selected, the response is generated using that template. For instance, in an embodiment, the response module 145 extracts information included in the request corresponding to the set of placeholder values defined for the template and automatically populates the placeholder values with the extracted information. For example, the template may include a placeholder value for the name of the requester, which is included in the request. The response module 145 extracts the name of the requester from the request and automatically populates the name into the corresponding placeholder value.

In an embodiment where one or more response sheets were configured by the professional, generating the response includes determining the response sheet that matches the request and including the configured information from the matching response sheet into the generated response. For instance, the response module 145 accesses the response sheet definitions stored in the data store 160 that informs how to match a request to a response sheet to determine which response sheet matches the request. The response sheet definitions may identify the matching response sheet. If there is a matching response sheet, then that matching response sheet is retrieved and the price and message determined using the matching response sheet.

Figure 30:
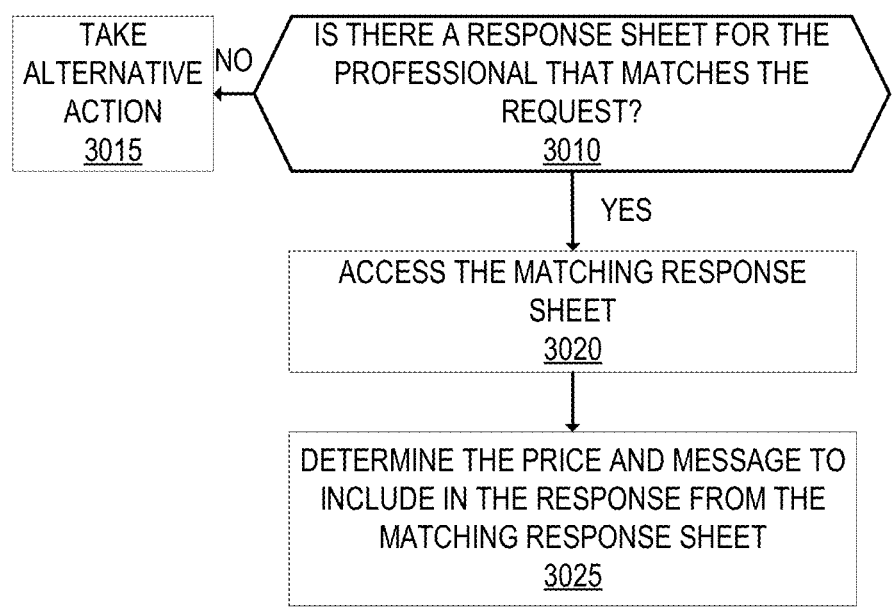
FIG. 30 is a flow diagram that illustrates exemplary operations for generating the response using a response sheet, according to an embodiment.

FIG. 30 is a flow diagram that illustrates exemplary operations for generating the response using a response sheet, according to an embodiment. The operations of FIG. 30 may be performed during operation 235 according to an embodiment. At operation 3010, the response module 145 determines whether there is response sheet for the professional that matches the request. For instance, the response module 145 may access the response sheet definitions in the data store 160 to determine if there is a response sheet for the professional that matches the request. For instance, if the request is for a DJ wedding event for 3 hours, the response module 145 access the response sheet definitions to determine if there is a response sheet for a DJ event wedding for 3 hours. If there is not a matching response sheet, then flow moves to operation 3015 where an alternative action is taken (e.g., a default price and message are included). If there is a matching response sheet, then flow moves to operation 3020 where the response module 145 accesses the matching response sheet. As an example, the response sheet definitions may include an identifier of the matching response sheet that can be used by the response module 145 to access the matching response sheet. Next, at operation 3025, the response module 145 determines the price and message to include in the response from the matching response sheet. For instance, the response module 145 calculates the total price for the request (dependent on the request preferences and the corresponding values defined in the matching response sheet) and determines the appropriate message from the matching response sheet.

Figure 31A:
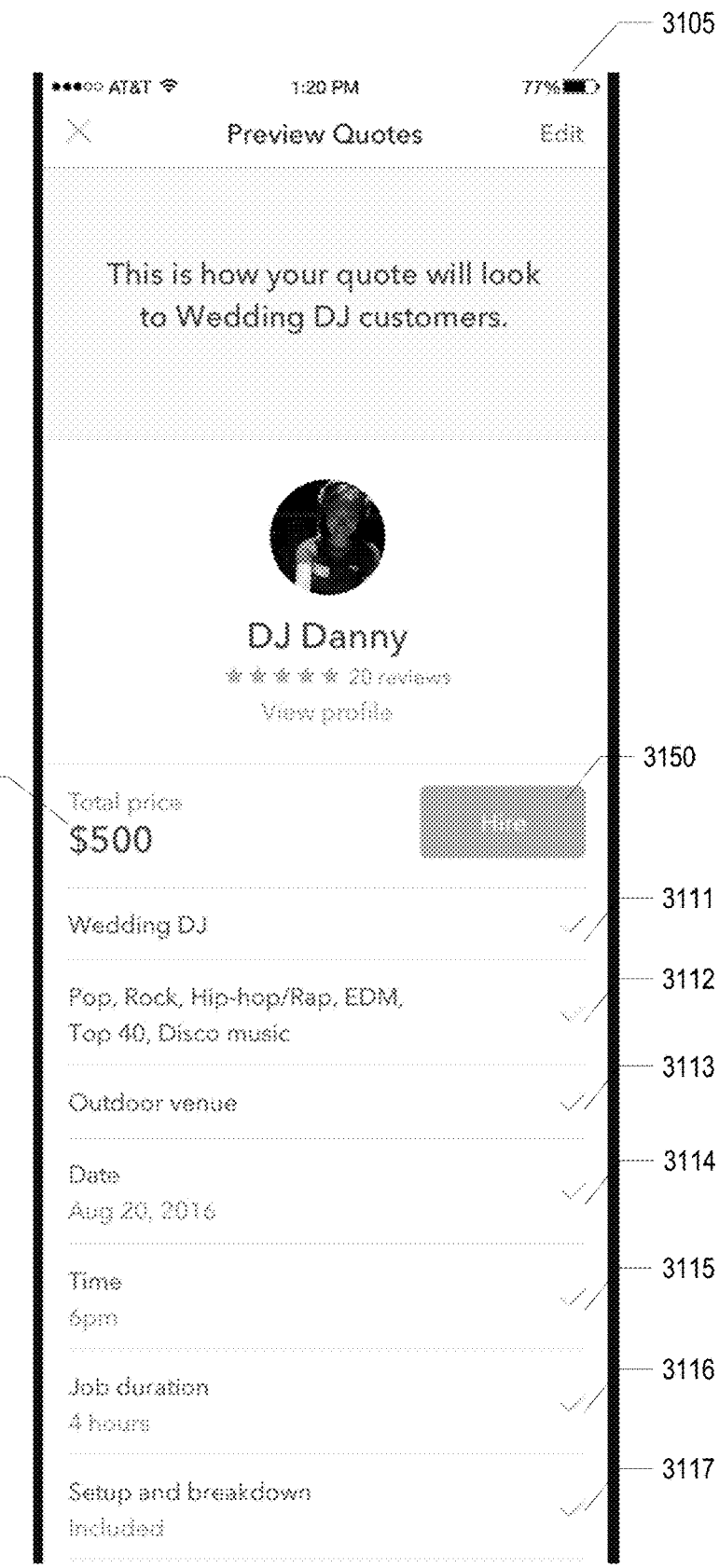
FIG. 31A is a portion of an exemplary response that has been automatically generated in accordance with an embodiment.
Figure 31B:
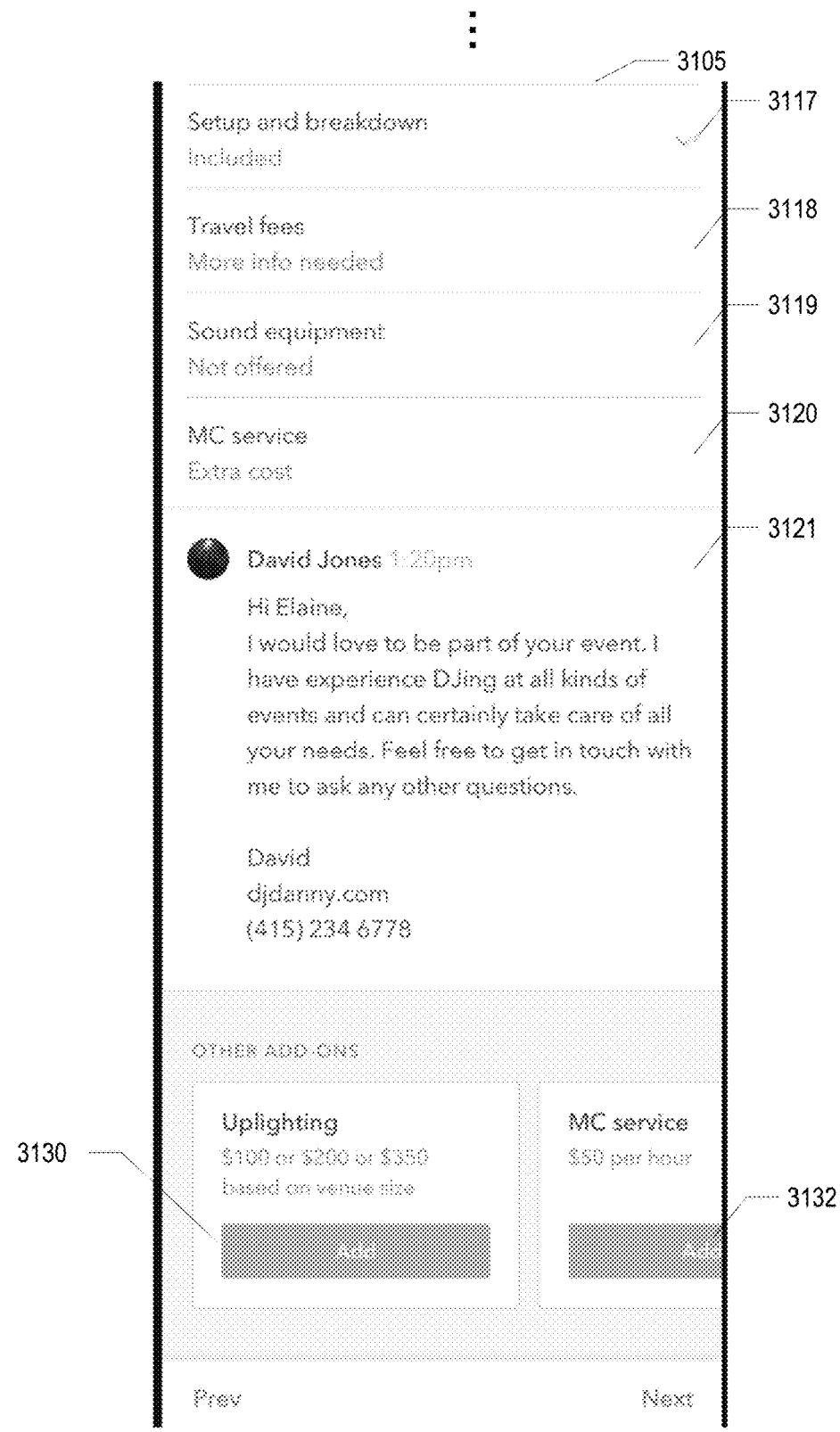
FIG. 31B is another portion of the exemplary response that has been automatically generated in accordance with an embodiment.

FIGS. 31A-B illustrate an exemplary response that has been automatically generated in accordance with embodiments described herein. The response 3105 specifies the following response parameters that detail the service provided by the professional that is relevant to the corresponding request, including: the element 3111 specifying the professional provides wedding DJ event service, the element 3112 specifying the type of music that can be provided by the professional, the element 3113 specifying that the professional can provide services to outdoor venues, the element 3114 specifying that the professional is available at the requested date, the element 3115 specifying that the professional is available at the requested time, the element 3116 specifying that the professional is available to provide a job duration of 4 hours, the element 3117 specifying that setup and breakdown is included, the element 3118 specifying that more info is needed regarding travel fees, the element 3119 specifying that sound equipment is not offered by the professional, and the element 3120 specifying that MC service is provided by the professional but at an extra cost. The response 3105 includes an option for the customer to request other add-ons to the service, including an uplighting add-on 3130 and an MC service add-on 532.

The response 3105 includes an automatically generated message 3121. The generated message 3121 may be generated through use of a template, as previously described. The generated message 3121 may include automatically populated values extracted from the request, such as the name of the requester.

The response 3105 includes the total price of the service, which may be an estimate of the total price, in element 3140. The price of the service may be automatically calculated according to the response sheet. The response 3105 includes a hire button 3150 that allows the customer to specify an intention of hiring the professional.

At operation 240, the generated response 180 is transmitted to the requesting customer via the customer device 105. In an embodiment, prior to transmitting the generated response 180, the generated response is provided to the responder for review. The response module 145 may cause a message to be transmitted to the responder (e.g., email, text message, phone call, message within a native application) that indicates that there is a response pending their review. The responder may then adjust the generated response including removing information, adding information, deleting information, and/or selecting a different template for generation of the response. In another embodiment, the generated response is automatically sent to the requesting requester on behalf of the responder without the responder reviewing or otherwise approving the generated response.

As described herein, the improved system for generating responses allows responders to create, manage, and/or configure multiple templates ahead of time for the different types of requests that they might receive. These templates can be automatically selected and a response can be automatically generated using these templates. As a result, the time that is necessary for the responder to respond to the request is greatly diminished. This allows time-sensitive requests to be answered promptly. Further, the generated responses are automatically tailored to fit the request. This allows the responses to be generated automatically without the responder needing to manually adjust the responses, thereby saving time and reducing error of manually reusing a previous response.

Figure 32:
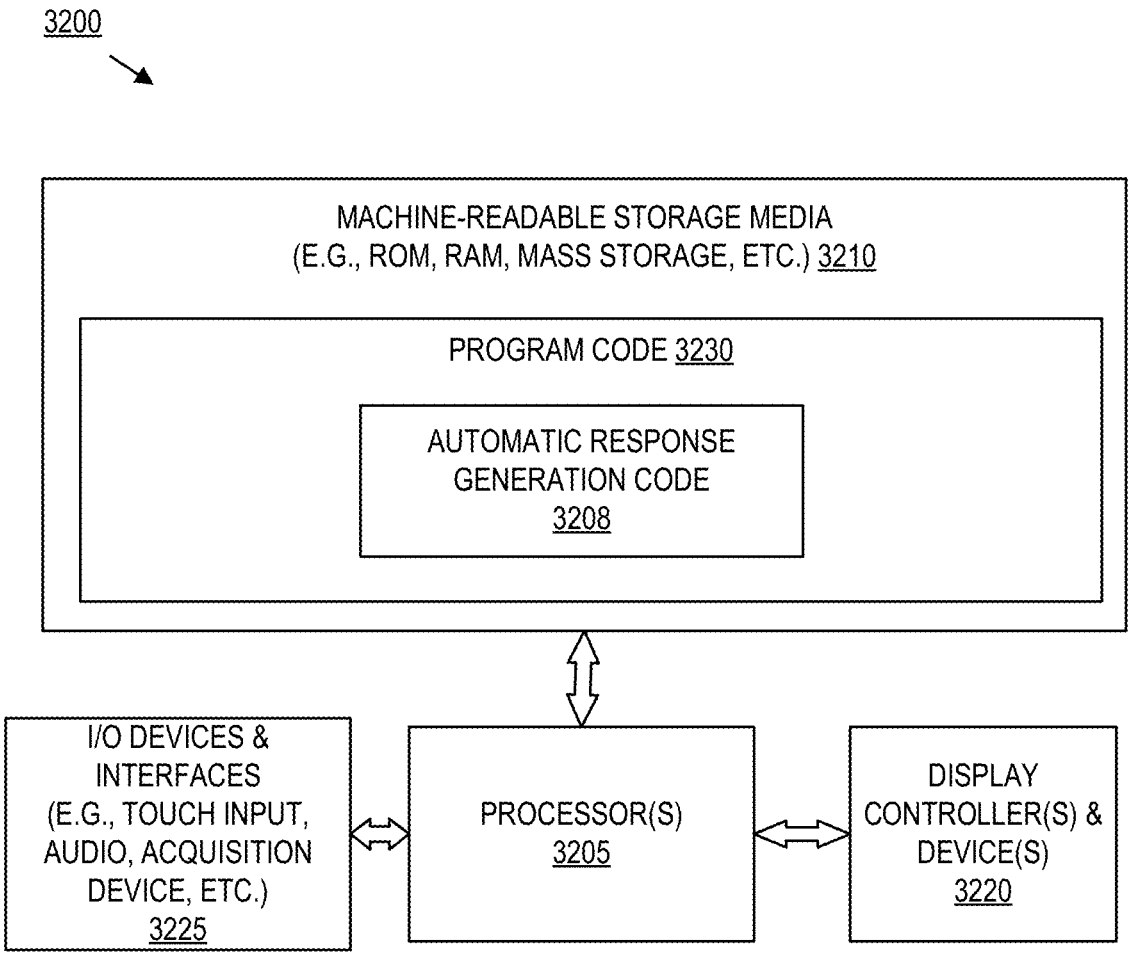
FIG. 32 is a block diagram illustrating an exemplary data processing system that may be used in some embodiments.

FIG. 32 illustrates a block diagram for an exemplary data processing system 3200 that may be used in some embodiments. Data processing system 3200 includes one or more processors 3205 and connected system components (e.g., multiple connected chips). Alternatively, the data processing system 3200 is a system on a chip or Field-Programmable gate array. One or more such data processing systems 3200 may be utilized to implement the embodiments and operations described with reference to FIGS. 1-31.

The data processing system 3200 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 3210 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 3205. For example, the depicted machine-readable storage media 3210 may store program code 3230 that, when executed by the processor(s) 3205, causes the data processing system 3200 to enable automatically generating a response on behalf of a first user to a request received from a second user. For example, the program code 3230 may include automatic response generation code 3208, which when executed by the processor(s) 3205, causes the data processing system 3200 to perform all or some of the operations described with reference to FIGS. 1-31. In some embodiments, the automatic response generation code 3208 may be stored on a centralized (backend) electronic device that is in communication with multiple electronic devices of service professionals and/or customers. In some embodiments, the automatic response generation code 3208 may include one or more subsets of codes stored on separate electronic devices, where each subset when executed on the respective electronic device causes the electronic device to perform some or all of the operations described with reference to FIGS. 1-31.

Thus, an electronic device (e.g., a computer or a mobile device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even while the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware. The data processing system 3200 may also include a display controller and display device 3220 to provide a visual user interface for the user, e.g., GUI elements or windows. The visual user interface (or graphical interface) may be used to enable a user to input structured information related to the request, for example.

The data processing system 3200 also includes one or more input or output ("I/O") devices and interfaces 3225, which are provided to allow a user to provide input to, receive output from, and otherwise transfer data to and from the system. These I/O devices 3225 may include a mouse, keypad, keyboard, a touch panel or a multi-touch input panel, camera, frame grabber, optical scanner, an audio input/output subsystem (which may include a microphone and/or a speaker for, for example, playing back music or other audio, receiving voice instructions to be executed by the processor(s) 3205, playing audio notifications, etc.), other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 3200. The I/O devices and interfaces 3225 may also include a connector for a dock or a connector for a USB interface, FireWire, Thunderbolt, Ethernet, etc., to connect the system 3200 with another device, external component, or a network. Exemplary I/O devices and interfaces 3225 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 3200 with another device, external component, or a network and receive stored instructions, data, tokens, etc. It will be appreciated that one or more buses may be used to interconnect the various components shown in FIG. 32.

It will be appreciated that additional components, not shown, may also be part of the system 3200, and, in certain embodiments, fewer components than that shown in FIG. 32 may also be used in a data processing system 3200.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server for automatically generating a response on behalf of a first user to a request received from a second user, comprising:
   receiving configuration information for configuring automatic response generation for the first user, wherein the received configuration information for configuring automatic response generation includes:
   information identifying the first user,
   information specifying a service provided by the first user including a first plurality of parameters that define details for the service, and
   information providing an availability of the first user to provide the service;
   receiving the request from the second user;
   selecting the first user from a plurality of users to respond to the request received from the second user, wherein the first user has a total number of responses allowed to be generated on behalf of the first user in a period of time, wherein the total number of responses are allowed to be generated on behalf of the first user in the period of time represents more capacity than the first user can perform, and wherein selecting the first user from the plurality of users includes determining that the first user is within the total number of responses over the period of time;
   automatically generating the response using at least some of the received configuration information; and
   automatically transmitting the response to the second user.

2. The method of claim 1, wherein the request specifies that the response be automatically generated as opposed to being manually generated.

3. The method of claim 1, wherein selecting the first user from the plurality of users includes receiving a selection indication from the second user of the first user.

4. The method of claim 1, wherein the received configuration information further includes information indicating pricing for the service including the plurality of parameters, and wherein automatically generating the response includes calculating a total price to fulfill the request and including the total price in the response.

5. The method of claim 1, wherein the request specifies a second plurality of parameters, and wherein selecting the first user to respond to the request received from the second user includes determining that the first user meets the second plurality of parameters specified in the request.

6. The method of claim 5, wherein automatically generating the response includes including information in the response from the received configuration information that matches the second plurality of parameters specified in the request.

7. A non-transitory machine-readable storage medium that provides instructions that, when executed by a processor of a server, causes the processor to perform operations for automatically generating a response on behalf of a first user to a request received from a second user, the operations comprising:
receiving configuration information for configuring automatic response generation for the first user, wherein the received configuration information for configuring automatic response generation includes:
information identifying the first user,
information specifying a service provided by the first user including a first plurality of parameters that define details for the service, and
information providing an availability of the first user to provide the service;
receiving the request from the second user;
selecting the first user from a plurality of users to respond to the request received from the second user, wherein the first user has a total number of responses allowed to be generated on behalf of the first user in a period of time, wherein the total number of responses are allowed to be generated on behalf of the first user in the period of time represents more capacity than the first user can perform, and wherein selecting the first user from the plurality of users includes determining that the first user is within the total number of responses over the period of time;
automatically generating the response using at least some of the received configuration information; and
automatically transmitting the response to the second user.

8. The non-transitory machine-readable storage medium of claim 7, wherein the request specifies that the response be automatically generated as opposed to being manually generated.

9. The non-transitory machine-readable storage medium of claim 7, wherein selecting the first user from the plurality of users includes receiving a selection indication from the second user of the first user.

10. The non-transitory machine-readable storage medium of claim 7, wherein the received configuration information further includes information indicating pricing for the service including the first plurality of parameters, and wherein automatically generating the response includes calculating a total price to fulfill the request and including the total price in the response.

11. The non-transitory machine-readable storage medium of claim 7, wherein the request specifies a second plurality of parameters, and wherein selecting the first user to respond to the request received from the second user includes determining that the first user meets the second plurality of parameters specified in the request.

12. The non-transitory machine-readable storage medium of claim 11, wherein automatically generating the response includes including information in the response from the received configuration information that matches the second plurality of parameters specified in the request.

13. A server, comprising:
a processor; and
a non-transitory machine-readable storage medium that provides instructions that, when executed by the processor, causes the processor to perform operations for automatically generating a response on behalf of a first user to a request received from a second user, the operations comprising:
receive configuration information for configuring automatic response generation for the first user, wherein the received configuration information for configuring automatic response generation is to include:
information identifying the first user,
information specifying a service provided by the first user including a first plurality of parameters that define details for the service, and
information providing an availability of the first user to provide the service;
receive the request from the second user;
select the first user from a plurality of users to respond to the request received from the second user, wherein the first user has a total number of responses allowed to be generated on behalf of the first user in a period of time, wherein the total number of responses are allowed to be generated on behalf of the first user in the period of time represents more capacity than the first user can perform, and wherein selection of the first user from the plurality of users includes a determination that the first user is within the total number of responses over the period of time;
automatically generate the response using at least some of the received configuration information; and
automatically transmit the response to the second user.

14. The server of claim 13, wherein the request is to specify that the response be automatically generated as opposed to being manually generated.

15. The server of claim 13, wherein automatic selection of the first user from the plurality of users includes receipt of a selection indication from the second user of the first user.

16. The server of claim 13, wherein the received configuration information further is to include information indicating pricing for the service including the first plurality of parameters, and wherein automatic generation of the response includes a calculation of a total price to fulfill the request and including the total price in the response.

17. The server of claim 13, wherein the request is to specify a second plurality of parameters, and wherein selection of the first user to respond to the request received from the second user includes a determination that the first user meets the second plurality of parameters specified in the request.

18. The server of claim 17, wherein automatic generation of the response is to include information in the response from the received configuration information that matches the second plurality of parameters specified in the request.

* * * * *